(12) United States Patent
Kim et al.

(10) Patent No.: US 8,635,544 B2
(45) Date of Patent: Jan. 21, 2014

(54) SYSTEM AND METHOD FOR CONTROLLING FUNCTION OF A DEVICE

(75) Inventors: Hee Woon Kim, Suwon-si (KR); Jae Joon Hwang, Seoul (KR); Yu Ran Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 12/694,785

(22) Filed: Jan. 27, 2010

(65) Prior Publication Data

US 2010/0192105 A1    Jul. 29, 2010

Related U.S. Application Data

(62) Division of application No. 14/123,456, filed on Nov. 23, 2013, which is an application for the reissue of Pat. No. 4,234,789.

(30) Foreign Application Priority Data

Jan. 29, 2009    (KR) .................. 10-2009-0006848

(51) Int. Cl.
*G06F 3/048*    (2013.01)

(52) U.S. Cl.
USPC ........................................ 715/764

(58) Field of Classification Search
USPC .................. 715/834, 764, 863, 864; 345/173
See application file for complete search history.

(56) References Cited

U.S. PATENT DOCUMENTS

| | | | | |
|---|---|---|---|---|
| 5,940,076 | A * | 8/1999 | Sommers et al. | 715/834 |
| 6,208,331 | B1 * | 3/2001 | Singh et al. | 345/173 |
| 6,248,946 | B1 * | 6/2001 | Dwek | 84/609 |
| 6,488,425 | B1 * | 12/2002 | Spence et al. | 400/714 |
| 6,678,009 | B2 * | 1/2004 | Kahn | 348/569 |
| 6,747,591 | B1 * | 6/2004 | Lilleness et al. | 341/176 |
| 6,990,489 | B2 * | 1/2006 | Kondo et al. | 1/1 |
| 7,231,231 | B2 * | 6/2007 | Kokko et al. | 455/566 |
| 7,499,003 | B2 * | 3/2009 | Rudolph et al. | 345/56 |
| 7,636,110 | B2 * | 12/2009 | Itoh et al. | 348/231.99 |
| 7,890,778 | B2 * | 2/2011 | Jobs et al. | 713/300 |
| 8,176,182 | B2 * | 5/2012 | Morita | 709/227 |
| 2003/0117427 | A1 * | 6/2003 | Haughawout et al. | 345/710 |
| 2005/0079896 | A1 * | 4/2005 | Kokko et al. | 455/566 |
| 2005/0146507 | A1 * | 7/2005 | Viredaz | 345/169 |
| 2007/0243925 | A1 * | 10/2007 | LeMay et al. | 463/20 |
| 2008/0188267 | A1 * | 8/2008 | Sagong | 455/566 |
| 2008/0204423 | A1 * | 8/2008 | Kim | 345/173 |
| 2009/0259932 | A1 * | 10/2009 | Bank et al. | 715/229 |
| 2009/0271731 | A1 * | 10/2009 | Lin et al. | 715/776 |
| 2009/0303187 | A1 * | 12/2009 | Pallakoff | 345/169 |

\* cited by examiner

*Primary Examiner* — Phenuel Salomon
(74) *Attorney, Agent, or Firm* — H.C. Park & Associates, PLC

(57) ABSTRACT

A method and a system are disclosed for function control using a display unit including a touch area and a non-touch area. The device includes an output area for displaying various types of screen data corresponding to execution applications, a control area for providing a graphical user interface (GUI) for controlling a function of the device, and a control unit for detecting execution of a particular application, configuring a screen comprising the output area and the control area in response to the executed application, and controlling a function of the device according to a user interaction occurring through the GUI in the control area.

36 Claims, 26 Drawing Sheets

SYSTEM AND METHOD FOR CONTROLLING FUNCTION OF A DEVICE

CROSS-REFERENCE TO RELATED APPLICATION

This application claims priority from and the benefit of Korean Patent Application No. 10-2009-0006848, filed on Jan. 29, 2009, which is hereby incorporated by reference for all purposes as if fully set forth herein.

BACKGROUND OF THE INVENTION

1. Field of the Invention

Exemplary embodiments of the present invention relate to a system and method for controlling a function of a device in an easy, simple, intuitive manner by using a display unit having control and output areas.

2. Description of the Background

Recent rapid advances in communication technologies have allowed continuous increases in the functionality of portable terminals and development of diversified User Interfaces (UIs) and diversified functions using UIs.

These improvements and developments include the recent appearance of a portable terminal having either a touch screen that replaces a typical keypad or a combination of a keypad and touch screen. Further, some portable terminals replace the dome key with a touch screen.

The touch screen as described above enables users to control various functions of the portable terminal. A portable terminal equipped with a touch screen provides various input events such as "tap," "drag," "flick," and "drag & drop," enabling a user to control functions of the portable terminal.

For example, a user of a portable terminal can control the navigation between objects through direct input of an event to an object by using a finger or stylus. During the direct event input, the finger or stylus may hide that object, contents displayed on the touch screen, or the entire touch screen, which may disturb the user's intuitive recognition of the effected change due to the object navigation and other graphical display details.

Further, since the portable terminal equipped with the touch screen usually uses the whole area of the Liquid Crystal Display (LCD) screen as the touch area, controlling the functions of the portable terminal is difficult since the user usually holds the portable terminal by one hand while performing the touch input on the touch area with the other hand.

Moreover, in the case of an icon or widget specified for the portable terminal equipped with a touch screen, a large image is commonly used for the user's touch input, which hinders the display of more information on a limited size screen.

Further, since touch screen-equipped portable terminal allows navigable operation through a simple user interface and event inputs, the terminal is limited in providing various levels of convenience and promoting users' interests.

SUMMARY OF THE INVENTION

Exemplary embodiments of the present invention provide a user interface and method of using the same that enable a user to intuitively, simply, and conveniently control functions of a device through a display unit.

Exemplary embodiments of the present invention also provide a method and system that can control functions of a device by using a display, which includes a half-touch area.

Exemplary embodiments of the present invention further provide a method and system that divide a display unit of a device into output and control areas while providing for a graphical user interface (GUI). The GUI is changeable according to an execution application in the control area so that a user can intuitively, simply, and conveniently control a function of the device according to the execution application through the GUI.

Exemplary embodiments of the present invention provide a method and system which divide a display unit of a device into an output area and a control area. The output area is a non-touch area used as an output unit according to an execution application. In contrast, the control area is a touch area adaptively providing a screen that can be used as a control unit responsive to the execution application.

Exemplary embodiments of the present invention provide a method and system, that use a lowermost part of an entire LCD area in a display unit of a device as a control area. The control area is a half-touch area with a GUI that changes in response to an execution application in the control area. The execution application is used to control functions of the device.

Exemplary embodiments of the present invention also provide a device having an output area for displaying screen data related to an execution application and a control area for displaying a GUI for control of a function corresponding to the execution application.

Exemplary embodiments of the present invention provide a function control system of a device that includes an output area for displaying various types of screen data corresponding to execution applications and a control area having a GUI that changes according to execution applications as well as controlling functions of the device through the GUI.

Exemplary embodiments of the preset invention additionally provide a device that includes an output area for displaying various types of screen data corresponding to execution applications, a control area with a GUI for controlling a function of the device, and a control unit. The control unit detects execution of a particular application, configures a screen comprising the output area and the control area in response to the executed application, and controls a function of the device according to a user interaction occurring through the GUI in the control area.

Exemplary embodiments of the present invention provide a method of controlling a function of a device that includes detecting execution of a particular application, displaying screen data according to the executed application in an output area of the screen data, displaying a GUI corresponding to the executed application in a control area, processing a function by a user interaction occurring in the output area, and changing and displaying screen data of the output area and the GUI of the control area in response to the processing of the function.

Exemplary embodiments of the present invention also provide a device having (a) a display unit for detecting execution of a particular application, for displaying screen data according to the executed application in an output area of the screen data, and for displaying a GUI corresponding to the executed application in a control area and (b) a control unit for processing a function by a user interaction occurring in the control area and for changing and displaying screen data of the output area and the GUI of the control area in response to the processing of the function.

Exemplary embodiments of the present invention provide that the output area is a non-touch area and that the control area is a touch area. The control area includes a soft key area and a wheel area for receiving an input from user interactions.

Exemplary embodiments of the present invention also provide that the output area and the control area are unique displays unit with the control area having a touch screen.

Additional features of the invention will be set forth in the description which follows, and in part will be apparent from the description, or may be learned by practice of the invention.

Exemplary embodiments of the present invention disclose a function control system of a device that includes an output area to display screen data corresponding to an execution application and a control area to provide a graphical user interface (GUI) that changes according to the execution application and to control a function of the device by using the GUI.

Exemplary embodiments of the present invention also disclose a device having an output area to display screen data corresponding to an execution application, a control area to provide a graphical user interface (GUI) to control a function of the device, and a control unit to detect execution of an execution application, to configure a screen comprising the output area and the control area in response to the executed application, and to control a function of the device in response to a user interaction occurring through the GUI.

Exemplary embodiments of the present invention additionally disclose a method of controlling a function of a device that includes detecting execution of an application, displaying screen data corresponding to the executed application in an output area, displaying a graphical user interface (GUI) corresponding to the executed application in a control area, processing a function in response to a user interaction with the GUI, changing the displayed screen data and the displayed GUI in response to the processing of the function.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
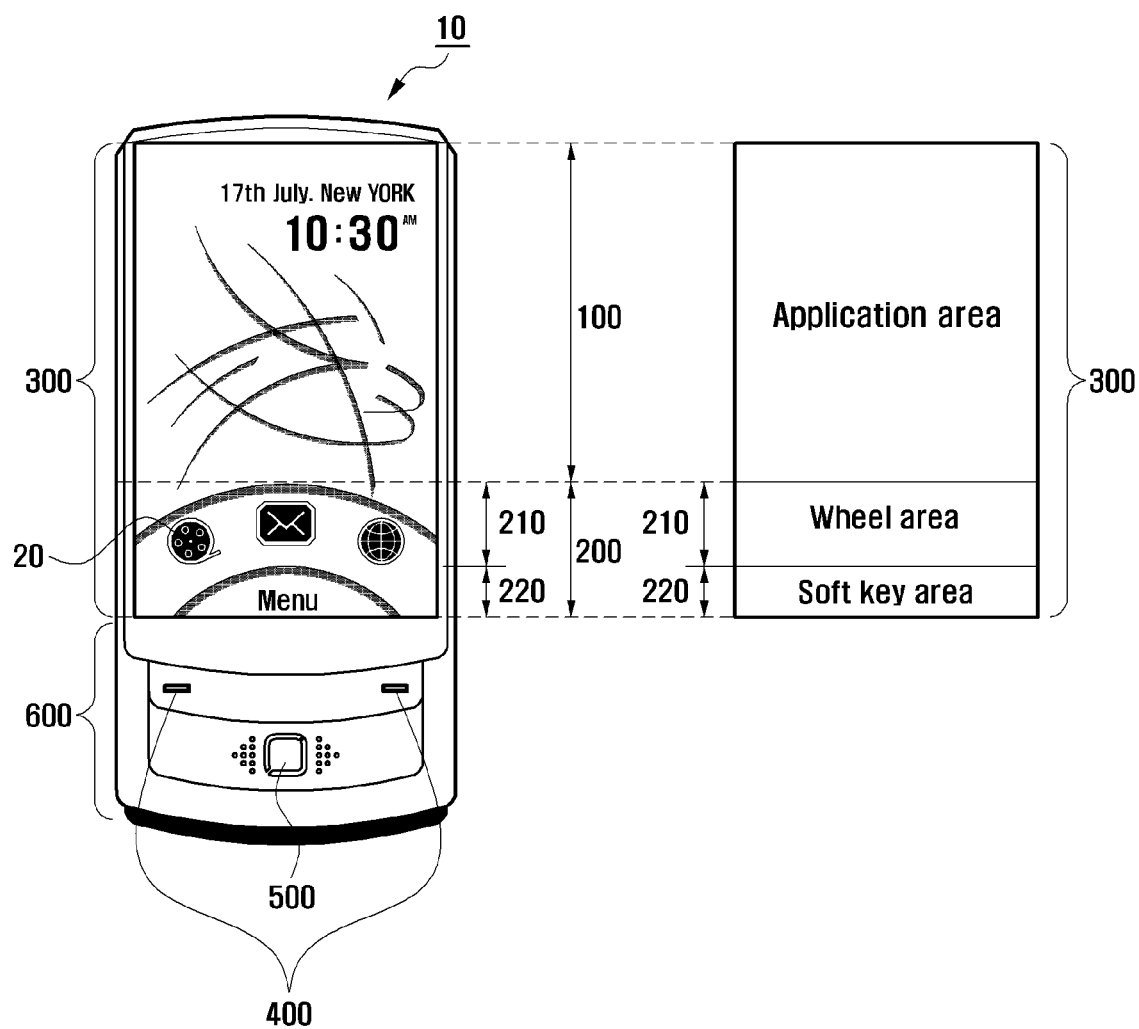
FIG. 1 shows an example of a portable terminal having a touch screen according to exemplary embodiments of the present invention.

The invention is described more fully hereinafter with reference to the accompanying drawings in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Exemplary embodiments of the present invention provide a system capable of controlling functions of a device by using a display unit of the device. Another exemplary embodiment of the present invention includes a display unit that is divided into a non-touch output area, a touch control area, and a user interaction input through the control area.

Included in exemplary embodiments of the present invention is a device having a display unit that includes an output area for displaying various types of screen data and a control area for receiving an input event from a user and displaying a GUI corresponding to an execution application. Information displayed and functions of the device are controllable through interactions between the output and control areas.

According to exemplary embodiments of the present invention, a control area is arranged at a lowermost part in a Liquid Crystal Display (LCD) area of a touch screen. The control area is a half-touch area, enabling a user to input various events, and provided with a GUI that is changeable according to the execution application of the device. The GUI enables control of user interactions and functions of a portable terminal.

The control area displays a GUI for controlling functions and operations of a device, and the GUI is displayed in different forms according to the execution application. A user conducts various user interactions through the GUI, and the device processes corresponding functions in response to the user interaction.

In exemplary embodiments of the present invention, a User Interface (UI) and a method using the UI are provided. The UI is a divided touch screen having an output area and a control area and controls functions of a device, including navigation between objects by user interaction through the control area, allowing for easy, convenient, and intuitive control.

A device according to exemplary embodiments of the present invention includes a display unit having an output area for displaying screen data of the device and a control area for displaying screen data corresponding to a situation of the device. Further, the device according to exemplary embodiments of the present invention includes a controller that controls (a) constructions of the output area and the control area based on the situation of the device, i.e., based on an execution application, (b) various functions of the device including navigation of an object through user interaction in the control area, and (c) the change of information in the control area in response to the execution application.

The following description includes the division of a screen into an output area and a control area in a display unit of the device and control of the device through interaction between the divided areas. Exemplary embodiments described below use a portable terminal as a representative example of the device. However, a method, an apparatus, and a system of exemplary embodiments of the present invention are not limited to use of the portable terminal and are applicable to any device including any type of input or display unit through which a user can input or output data according to the following embodiments of the present invention. For example, exemplary embodiments of the present invention may be applied to devices including portable terminals, such as a mobile communication terminal, a personal digital assistant (PDA), a portable game terminal, a digital broadcast player, a smart phone, and display devices such as a television (TV), a large format display (LFD), a digital signage (DS), and a media pole. Devices which exemplary embodiments of the present invention are applicable include all information communication apparatus, multimedia apparatus, and application apparatus thereof. Further, the input unit device includes a touchpad, a touch screen, a motion sensor, a voice recognition sensor, a remote controller, and a pointing apparatus. Further, exemplary embodiments are described with a non-touch area. This is an area that does not receive touch input. Similarly, a half-touch area is an area that receives touch input in a portion of the referenced area. Here, "half-touch" does not require or imply any limitation as to the size of the half-touch area.

Although the exemplary embodiments of the present invention described below discuss a method, an apparatus, and a system using a portable terminal as representative examples, exemplary embodiments of the present invention are not limited to the portable terminal and an operation method thereof and is applicable to the portable terminal and all types of electronic apparatus, including a display.

Hereinafter, exemplary embodiments of the present invention are described in detail with reference to the accompanying drawings.

FIG. 1 shows an example of a portable terminal having a touch screen according to exemplary embodiments of the present invention.

Referring to FIG. 1, a portable terminal 10 includes a display unit 300, which includes an output area 100 for displaying various screen data corresponding to execution applications and a control area 200 for displaying screen data corresponding to the execution applications and for controlling functions of the portable terminal 10 and objects of the screen data displayed in the output area 100.

Further, the portable terminal 10 may include an input unit 600 including at least one of a soft key, a dome key, a keypad, and a touch pad, which are assigned functions of the portable terminal 10.

The control area 200 may receive an input by user interaction through a GUI for controlling the functions of the portable terminal 10. The GUI is provided in the form of a virtual item adaptively changing in response to the execution application and is not fixed in a particular form. By generating an input event through the GUI, the user can control the functions of the portable terminal 10 and navigation between the objects in the output area 100. Various GUIs in the control area 200 and examples using the GUIs will be described hereinafter with reference to the accompanying drawings. FIG. 1 corresponds to a case in which at least one virtual item 20 enabling instant execution of a predetermined specific function is displayed in the control area 200.

The control area 200 includes a wheel area 210 and a soft key area 220. The wheel area 210 transfers commands by an input event for navigation of an object displayed in the output area 100, for example, an input event for increasing or decreasing a particular value provided in the output area 100. The input event may include events such as a sweep event or a flick event.

Further, particular option commands corresponding to execution applications may be mapped to the wheel area 210. At this time, the wheel area 210 may be divided into a number of tap points. As a result, a user can issue a command for an option of an object provided in the output area 100. The input event may include a tap event.

Moreover, the wheel area 210 may provide a GUI through which it is possible to instantly execute a particular application. The GUI may be provided as at least one virtual item 20 having a shape of an icon capable of identifying a pertinent application. By interacting with the virtual item 20 in the wheel area 210, a user may instantly execute the particular application mapped to the virtual item 20.

The soft key area 220 may be allocated with a function such as a command selection, execution, or option setting of a particular object provided in the output area 100. As a result of interacting with soft key area 220, the user can select a particular object or generate an input event for execution of a function of a particular object. The input event may include a tap event.

A scheme for controlling the functions of the portable terminal 10 by using the wheel area 210 and the soft key area 220 will be described in more detail with reference to the accompanying drawings showing exemplary screens of the portable terminal 10.

A screen of the portable terminal 10 may display a pop-up window according to execution of a particular function through the control area 200. Such a screen displaying a pop-up window will be described later in more detail with reference to the drawings.

The input unit 600 may include an input key area 400 with allocated input keys for execution of particular functions of portable terminal 10 and a navigation area 500 for navigation control of objects displayed by the display unit 300. However, the input unit 600 is not limited to the illustrated construction described above and may include one or a combination of a soft key, a dome key, a key pad, and a touch pad according to the type of portable terminal 10. The input unit 600 may be a Physical User Interface (PUI) performing functions described above.

A division between the output area 100 and the control area 200 is for convenience of description, and the output area 100 not only displays various types of screen data but also allows a user's event input. However, the output area 100 serves as a non-touch area for displaying screen data. In other words, the output area 100 does not serve as an input unit. Further, although the control area 200 is described as a touch area for the input of an event for function control of a particular application or input of an event for object navigation provided in the output area 100, the control area 200 can display GUI objects of various shapes. A GUI object corresponding to an execution application is provided through the control area 200, and the user can command function control of a portable terminal 10 through the GUI object.

In the following description, the output area 100 corresponds to an area for outputting various types of screen data, and the control area 200 corresponds to an area expressed through a GUI for controlling an object existing in the output area 100 and for controlling functions of the portable terminal 10. An interaction of a user using the control area 200 is accompanied by a change of the screen data in the output area 100, reflecting new screen data due to the interaction.

The shape of the portable terminal 10 is not limited to the shape as described or illustrated and may include all types of portable terminals having a display unit 300 including an output area 100 and a control area 200.

As described above, FIG. 1 illustrates a portable terminal 10 having a display unit 300 including an output area 100 for displaying various types of screen data and a control area 200 for receiving an input event of the user and for displaying a GUI for the input event. A method of controlling functions of the portable terminal through a user interface is accomplished where, through the control area 200, the user can perform (a) navigation interaction of an object such as a menu list by generating an input event (e.g., a sweep event) associated with the wheel function, (b) perform an interaction enabling a fast execution of a corresponding option by generating an input event (tap event) corresponding to an option command allocated in the control area 200, (c) perform an interaction selecting a particular object or executing a function or an application corresponding to a pertinent object by generating an input event (tap event) corresponding to a selection or execution function allocated in the control area 200, or (d) perform an interaction enabling a fast execution of a particular application corresponding to a pertinent virtual item 20 by generating an input event on the virtual item 20 having the function of a "quick link" provided in the control area 200.

Figure 2:
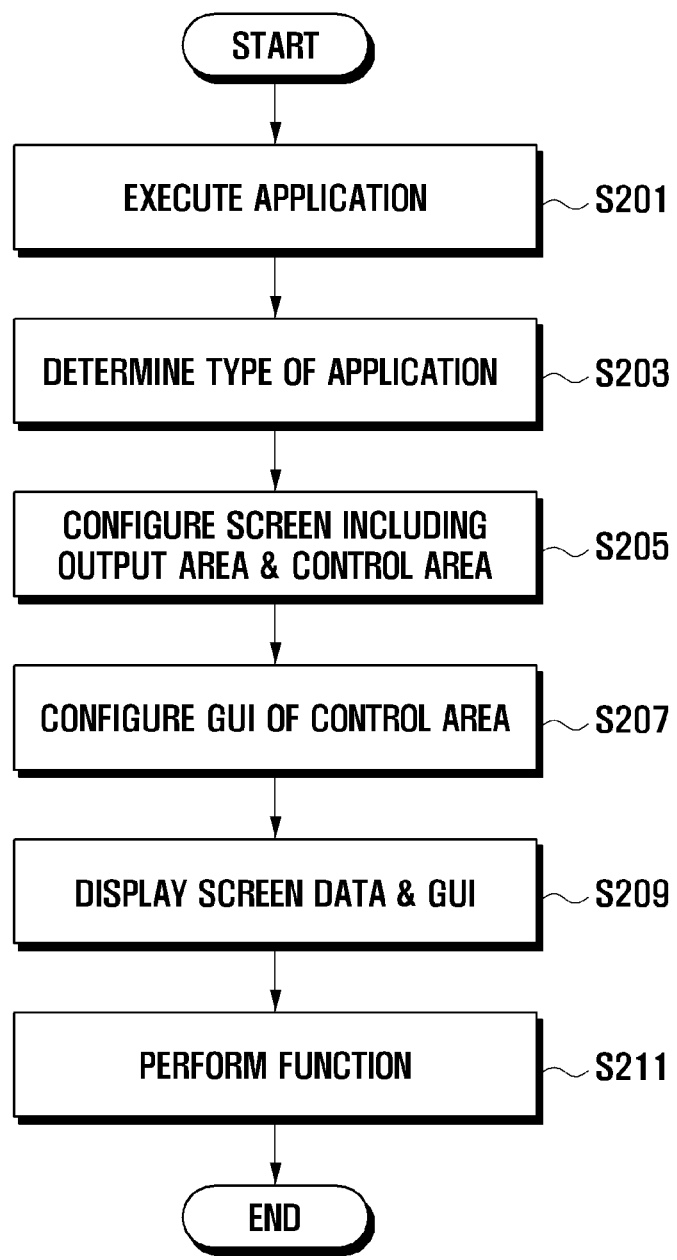
FIG. 2 is a flow diagram showing a method of controlling functions of a portable terminal according to exemplary embodiments of the present invention.

FIG. 2 is a flow diagram showing a method of controlling functions of a portable terminal 10 according to exemplary embodiments of the present invention.

Referring to FIG. 2, in response to a request from a user, a portable terminal 10 can execute a particular application (step S201), and then the portable terminal 10 determines the type of the executed application (step S203). Next, the portable terminal configures a screen for output area 100 and control area 200 according to the type of the application (step S205). Thereafter, the portable terminal 10 configures a GUI of the control area 200 according to the type of the application (step S207), i.e., the portable terminal 10 configures screen data of the control area 200 by extracting a GUI corresponding to the type of the application. The portable terminal 10 subsequently displays the GUI in the control area 200 and the screen data in the output area 100 in response to the executed application (step S209). Thereafter, the portable terminal 10 can perform a function corresponding to the executed application or a function according to a user request occurring in the executed application (step S211).

Figure 3:
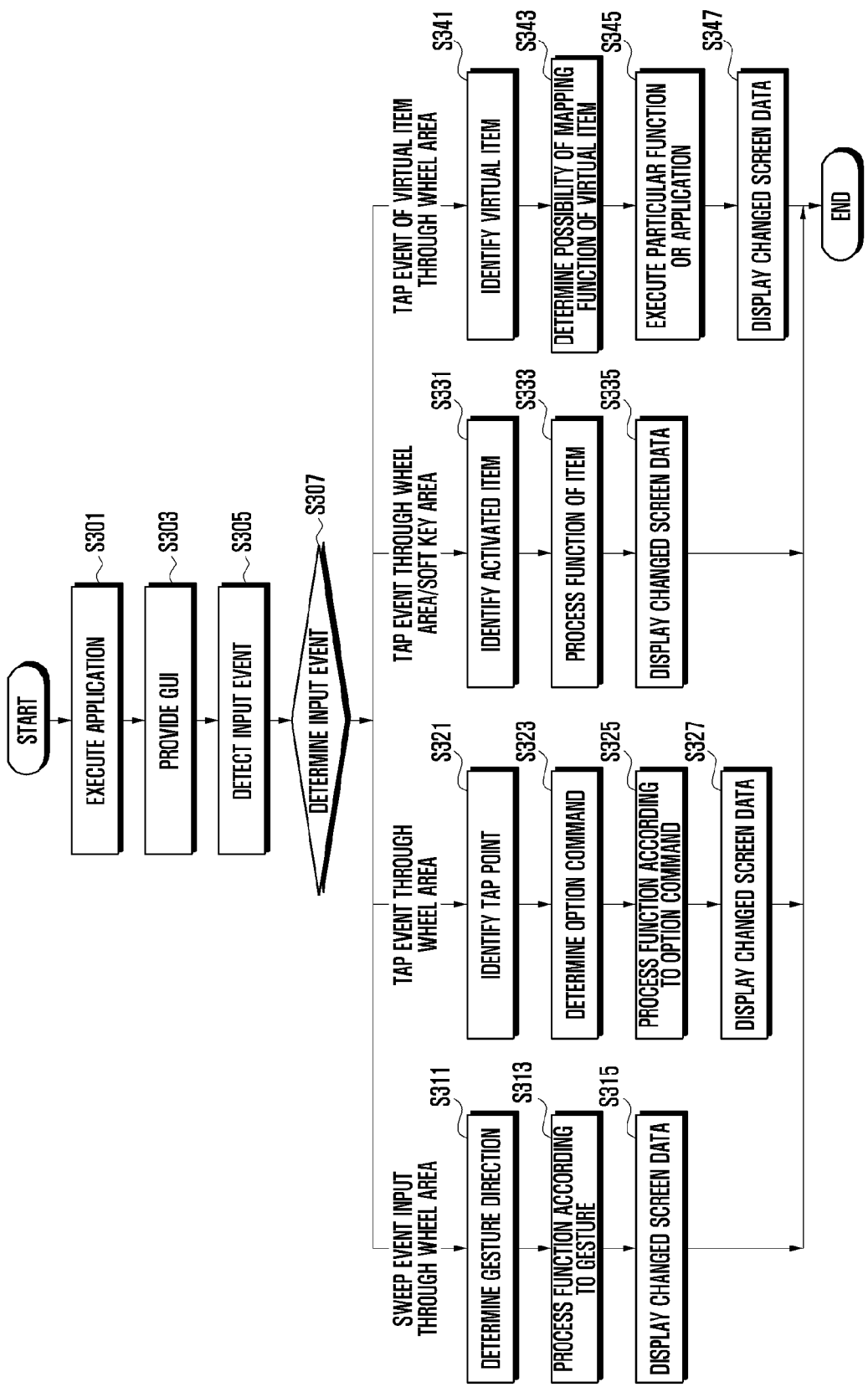
FIG. 3 is a flow diagram showing a user interaction using a control area in a portable terminal according to exemplary embodiments of the present invention.

FIG. 3 is a flow diagram showing a user interaction using a control area 200 in a portable terminal 10 according to exemplary embodiments of the present invention.

Referring to FIG. 3, a portable terminal 10 executes a particular application according to a request from a user (step S301). As described above with reference to FIG. 2, the portable terminal 10 configures a screen including an output area 100 and a control area 200, displays screen data according to the application in the output area 100, and displays a GUI according to the application in the control area 200 (step S303). The portable terminal 10 then detects an input event of a user through the control area (step S305) and determines the area in which the input event occurs and a function of the input event (step S307). When the portable terminal 10 detects the input event, the portable terminal 10 determines if the input event occurs in the wheel area 210 or the soft key area 220 within the control area 200 and analyzes the input type of the input event in the corresponding area. The portable terminal 10 can determine the particular input event such as a sweep or flick event corresponding to a user interaction or a tap event occurring on a particular tap point. Hereinafter, operations according to input events in the corresponding area will be described with reference to the exemplary screen embodiments shown in FIGS. 4 to 6.

Figure 4:
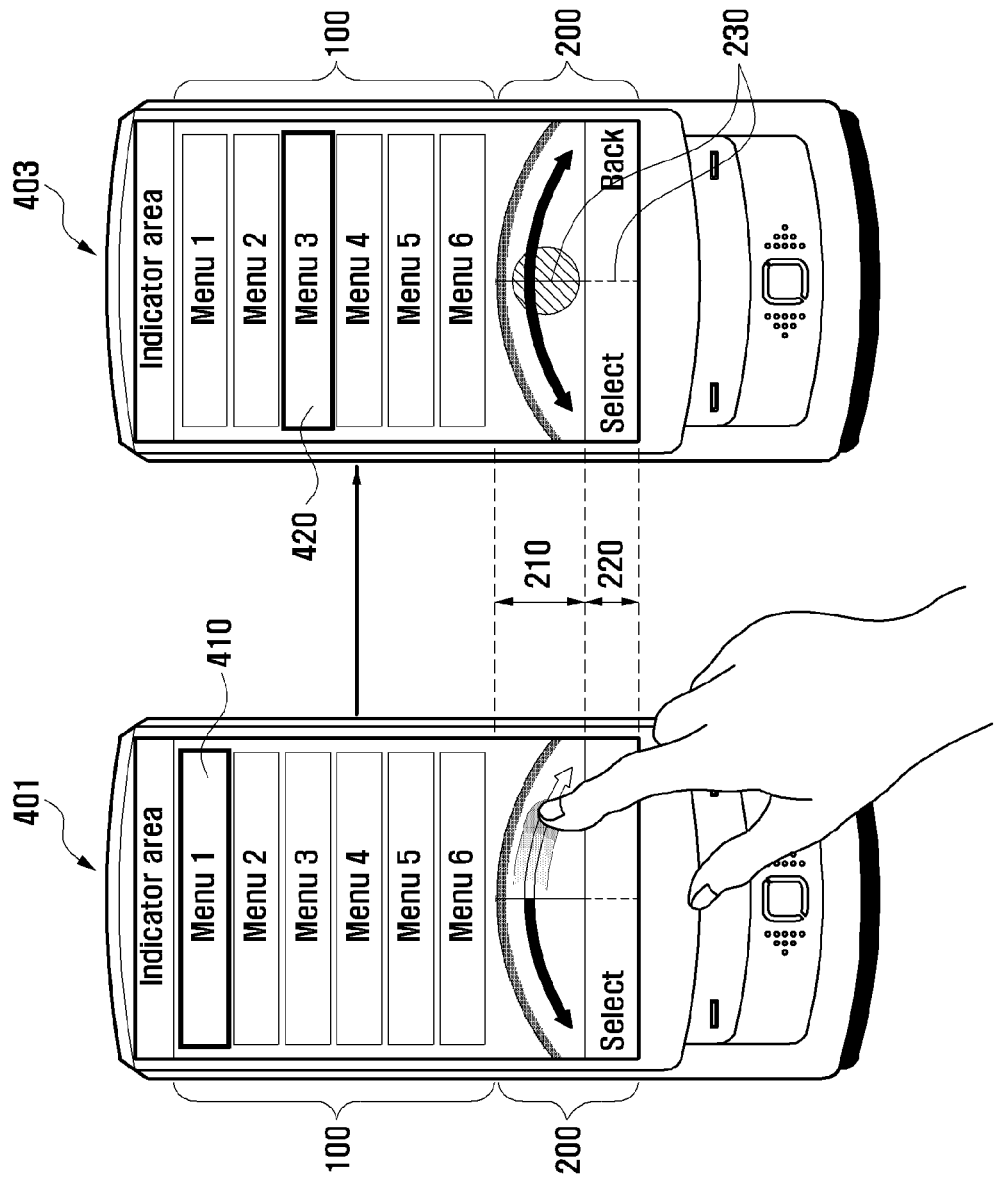
FIG. 4, FIG. 5, and FIG. 6 show exemplary screens for user interaction using a is control area in a portable terminal according to exemplary embodiments of the present invention.
Figure 5:
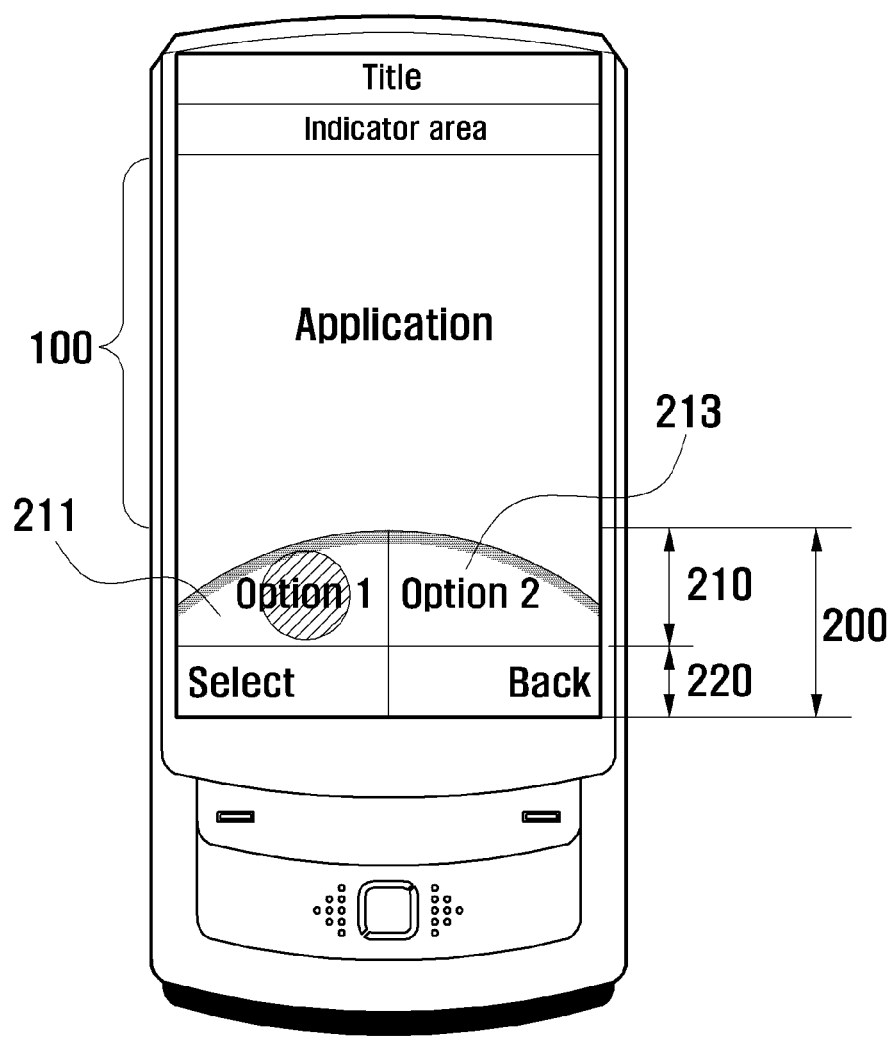
Figure 6:
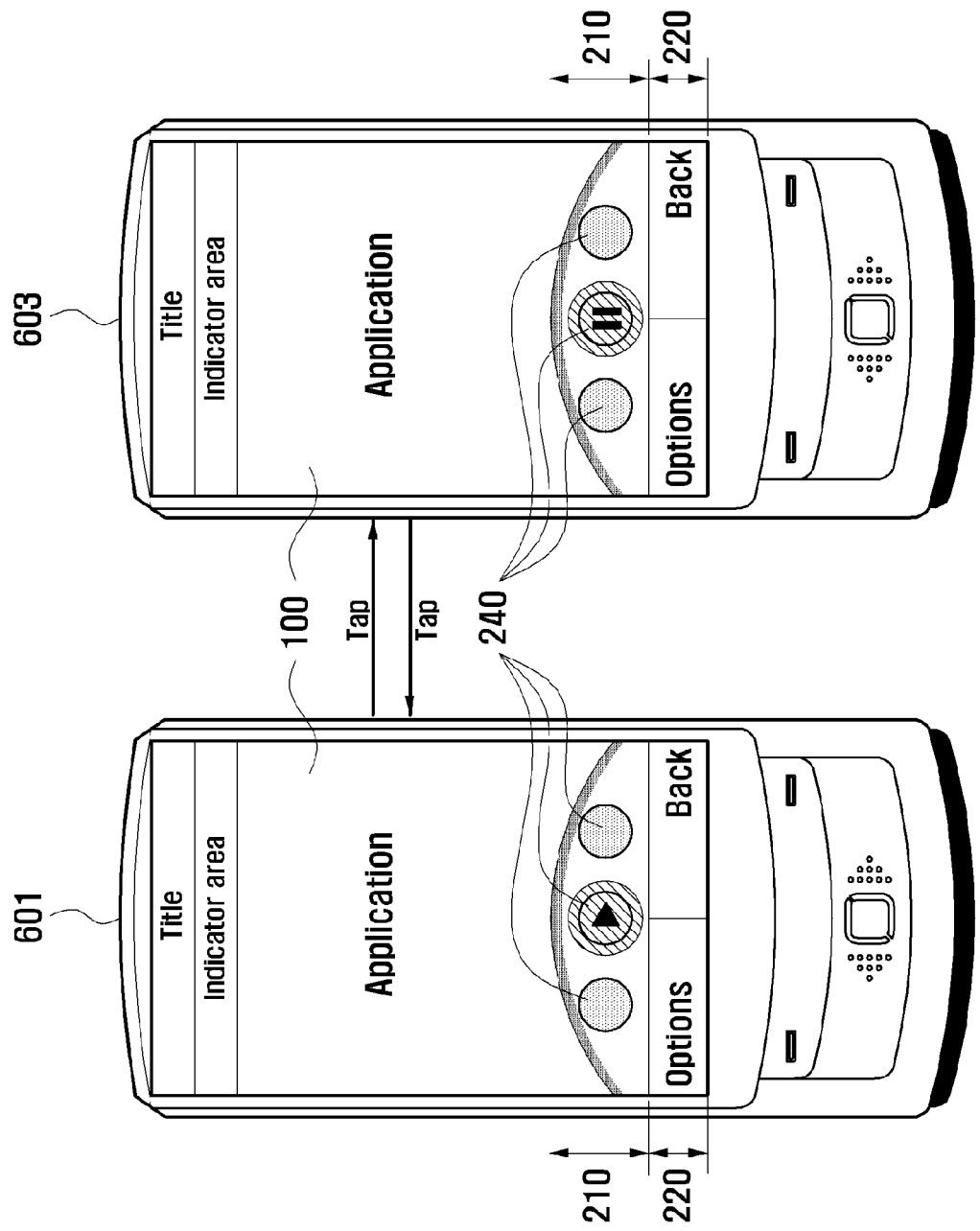

The process shown in FIG. 3 includes exemplary embodiments such as the case shown in FIG. 4 in which the portable terminal 10 detects a sweep event through the wheel area 210, the case shown in FIG. 5 in which the portable terminal 10 detects a tap event through the wheel area 210, the case shown in FIG. 4 in which the portable terminal detects a tap event through the wheel area 210 or the soft key area 220, or the case shown in FIG. 6 in which the portable terminal 10 detects a tap event of a virtual item 240 through the wheel area 210, which will be discussed with reference to each example.

As a result of the determination in step S307 in FIG. 3, when the input event is an input event (hereinafter referred to as "sweep event" as an example) through the wheel area 210 of the control area 200, the portable terminal 10 determines the direction of the propagation of the gesture according to the sweep event (step S311). Thereafter, the portable terminal 10 processes the function according to the gesture (step S313). For example, the portable terminal 10 performs navigation between objects of screen data provided in the output area 100 or alters (e.g., increases or decreases) a particular value (e.g., Volume, Zoom In/Out, etc.) corresponding to a particular application. Next, the portable terminal 10 displays new screen data according to the above processing of the functions (step S315). For example, the portable terminal 10 may display screen data in which the object activated according to the navigation has been changed.

Exemplary screen embodiments corresponding to steps S311 to S315 as described above are shown in FIG. 4. FIG. 4 shows examples of user interaction using the control area 200 according to exemplary embodiments of the present invention. The exemplary embodiments shown in FIG. 4 correspond to a process of navigation between objects as a process of performing a function according to a sweep event as indicated by the motion of a user's finger in FIG. 4.

Referring to FIG. 4, by generating a sweep event in the wheel area 210 of the control area 200, the user can perform navigation between objects of screen data provided in the output area 100. As noted by the indication of reference numerals 401 and 403, the user can perform a gesture including a touch in the wheel area 210 and rightward movement thereafter. In response to the gesture, the portable terminal performs navigation between objects in the output area 100 and provides screen data according to a result of the navigation. For example, the portable terminal 10 provides a screen before the navigation in which the item of Menu 1 (410) is in an activated state and provides a screen after the navigation in which the item of Menu 3 (420) is in an activated state.

As a result of the determination in step S307 in FIG. 3, when the input event is an input event (hereinafter, referred to as "tap event" as an example) through the wheel area 210 of the control area 200, the portable terminal 10 identifies the tap point at which the tap event occurs (step S321). That is, the portable terminal 10 can identify the divided areas of the wheel area 210. Thereafter, the portable terminal 10 recognizes the option command allocated to the tap point at which the tap event occurs (step S323).

Next, the portable terminal 10 processes the function related to the option command allocated to the tap point at which the tap event occurs (step S325). Examples of option commands may include "view", "reply", "forward", "edit", "save profile", "video call", "send message", "save", "change type", and "change", and each option command may be changeably allocated to the tap points divided in accordance with the execution applications.

The portable terminal 10 subsequently configures and displays new screen data obtained through the change according to the processing of the functions as described above (step S327). For example, the portable terminal 10 may display new screen data that has been changed according to the function or application executed in response to a particular option command as described above.

FIG. 5 shows an exemplary embodiment of the present invention of a user interaction using the control area 200. The exemplary embodiment shown in FIG. 5 corresponds to a process of function processing according to a tap event of a user, which simply and conveniently processes the option command set through the wheel area 210. By generating a tap event in the wheel area 210 of the control area 200, the user can instantly perform the particular option of the object of the screen data provided in the output area 100. In the screen shown in FIG. 5, the wheel area 210 is divided into two tap points 211 and 213 in accordance with the execution application.

By generating a tap event on a particular tap point 211 or tap point 213 in the wheel area 210, the user can issue a desired command. For example, tap point 211 and tap point 213 may be assigned an option command such as "view", "reply", "forward", "edit", "save profile", "video call", "send message", "save", "change type", and "change". The user can instantly execute a particular option allocated to the current tap point from among exemplary option commands as described above. Exemplary embodiments of function processing according to each option command will be described in more detail with reference to the exemplary screen embodiments.

As a result of the determination in step S307 shown in FIG. 3, when the input event is an input event (hereinafter referred to as "tap event" as an example) executed through the wheel area 210 or soft key area 220 of the control area 200, the portable terminal 10 identifies a currently activated object item from among the object items provided in the output area 100 (step S331). For example, the portable terminal 10 identifies a particular menu item that is currently focused on and activated in a particular menu list.

Thereafter, the portable terminal 10 processes the function in relation to the activated object item according to the tap event (step S333). For example, the portable terminal 10 searches for an item of the activated object or executes a particular application corresponding to the activated object. Next, the portable terminal 10 configures and displays new screen data obtained through the change according to the processing of the functions as described above (step S335). For example, the portable terminal 10 may display new screen data obtained by a change according to the execution of the particular application.

Exemplary screen embodiments corresponding to steps S331 to S335 as described above are shown in FIG. 4. FIG. 4 shows examples of user interaction using the control area 200 according to exemplary embodiments of the present invention. The exemplary embodiments shown in FIG. 4 correspond to a function processing according to a tap event of a user, i.e., function processing according to an activated object.

Referring to FIG. 4, by generating a tap event on a tap point in the wheel area 210 or the soft key area 220 of the control area 200, the user can select a currently activated particular object from among the objects of the screen data provided in the output area 100 and perform function processing of the selected object.

As indicated by reference numeral 403, the user can generate a tap event on one tap point from among the tap point 230 of the soft key area 220 or the wheel area 210. Then, in response to the generated tap point, the portable terminal processes a function set for a currently activated particular object from among the objects in the output area 100 and provides screen data according to a result of the processing. For example, as shown in the screen designated by reference numeral 403, when a tap event occurs on the tap point 230 of the soft key area 220 in a state in which the item of Menu 3 (420) is in an activated state, the portable terminal 10 can search for and display a detailed item of Menu 3 (420) or execute an application mapped to Menu 3 (420) and display screen data obtained through the execution.

As a result of the determination in step S307 in FIG. 3, when the input event is an input event (hereinafter referred to as "tap event" as an example) of a virtual item through the wheel area 210 of the control area 200, the portable terminal 10 identifies the virtual item generated by the tap event (step S341). Thereafter, the portable terminal 10 recognizes the function mapped to the identified tap event (step S343).

Next, the portable terminal 10 processes the function related to the virtual item or executes a particular application (step S345). For example, the portable terminal 10 processes a function relating to a multimedia item of the virtual item in response to the execution application or executes a particular application such as allowing entry of a text message or opening a phone book associated with the virtual item.

Next, the portable terminal 10 configures and displays new screen data obtained through a change according to the processing of a function as described above (step S347). For example, at the time of processing the function relating to the reproduction of a multimedia item as described above, the portable terminal 10 may display new screen data that has been changed according to the processing of the function or execution of a particular application.

Exemplary screen embodiments corresponding to steps S341 to S347 are shown in FIG. 6. FIG. 6 shows an exemplary embodiment of a user interaction using the control area 200. The exemplary embodiments shown in FIG. 6 correspond to a process of function processing according to a tap event of a user, which can instantly perform a particular function through a virtual item 240 provided in the wheel area 210.

Referring to FIG. 6, by generating a tap event on a virtual item 240 provided in the wheel area 210 of the control area 200, the user can control a function relating to an application provided in the output area 100. The exemplary screen embodiments illustrated in FIG. 6 provide a particular number of virtual items 240 corresponding to functions such as reproduction control according to an application relating to the multimedia item reproduction.

As noted from the indication by reference numerals 601 and 603, the user can command execution of functions such as reproduction or stopping of a multimedia item by generating a tap event on the virtual item 240. Upon detecting a tap event of a user through the virtual item 240, the portable terminal 10 executes the function mapped to the virtual item 240 and configures and provides screen data reproduced or stopped according to the execution of the function. The exemplary embodiments of function execution based on the virtual item 240 will be described in more detail with reference to exemplary screen embodiments.

The above description discusses a portable terminal 10 including an output area 100 and a control area 200 and an operation of processing functions of a portable terminal 10 in response to interaction of a user with the portable terminal 10 according to exemplary embodiments of the present invention. Hereinafter, exemplary embodiments for configuring a control area 200 according to an execution application and operation according to a user interaction through the control area 200 will be discussed with reference to exemplary screen embodiments.

Figure 7A:
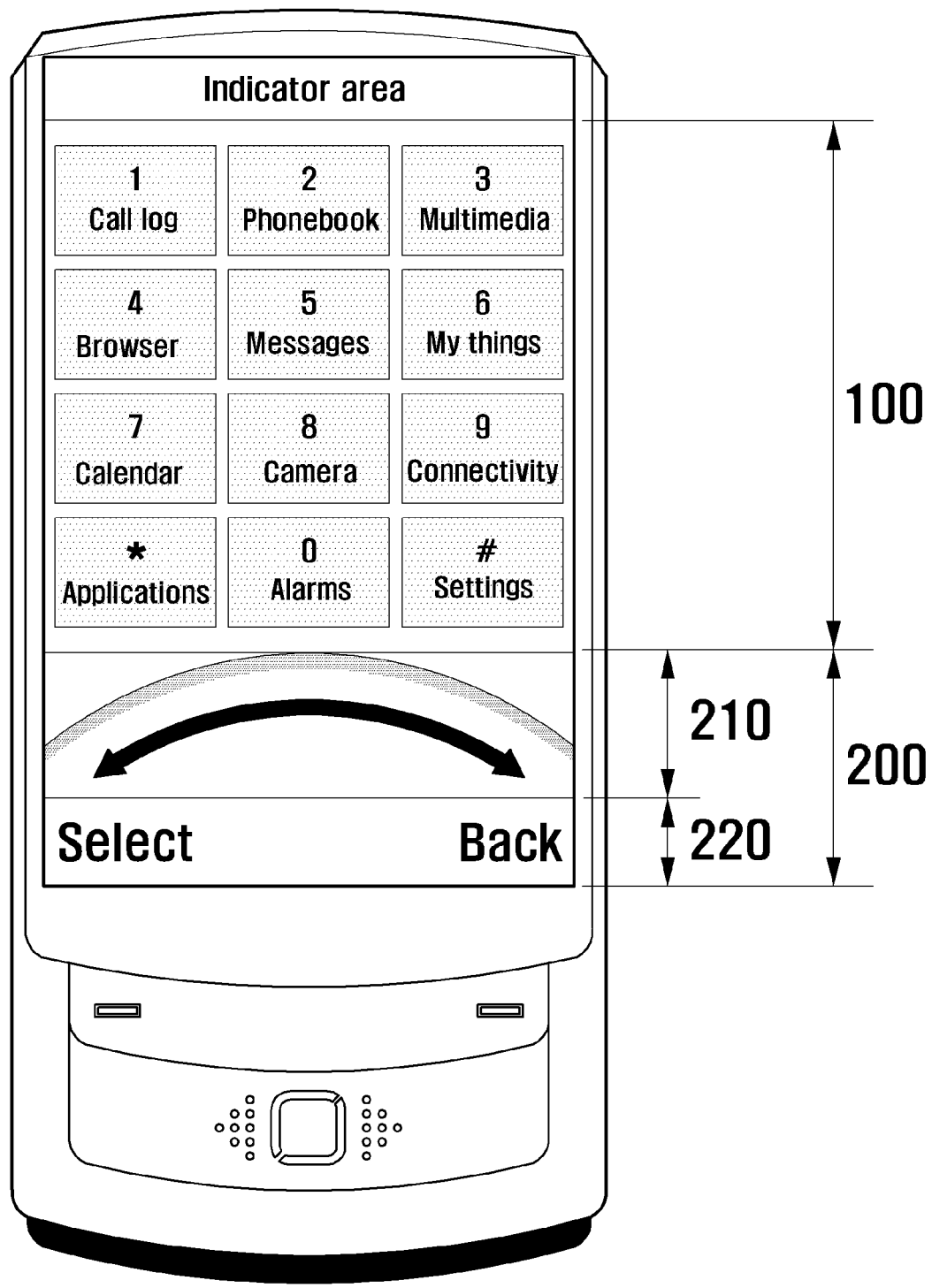
FIG. 7A, FIG. 7B, and FIG. 7C show exemplary screens allowing object navigation in response to user interactions in a portable terminal according to exemplary embodiments of the present invention.
Figure 7B:
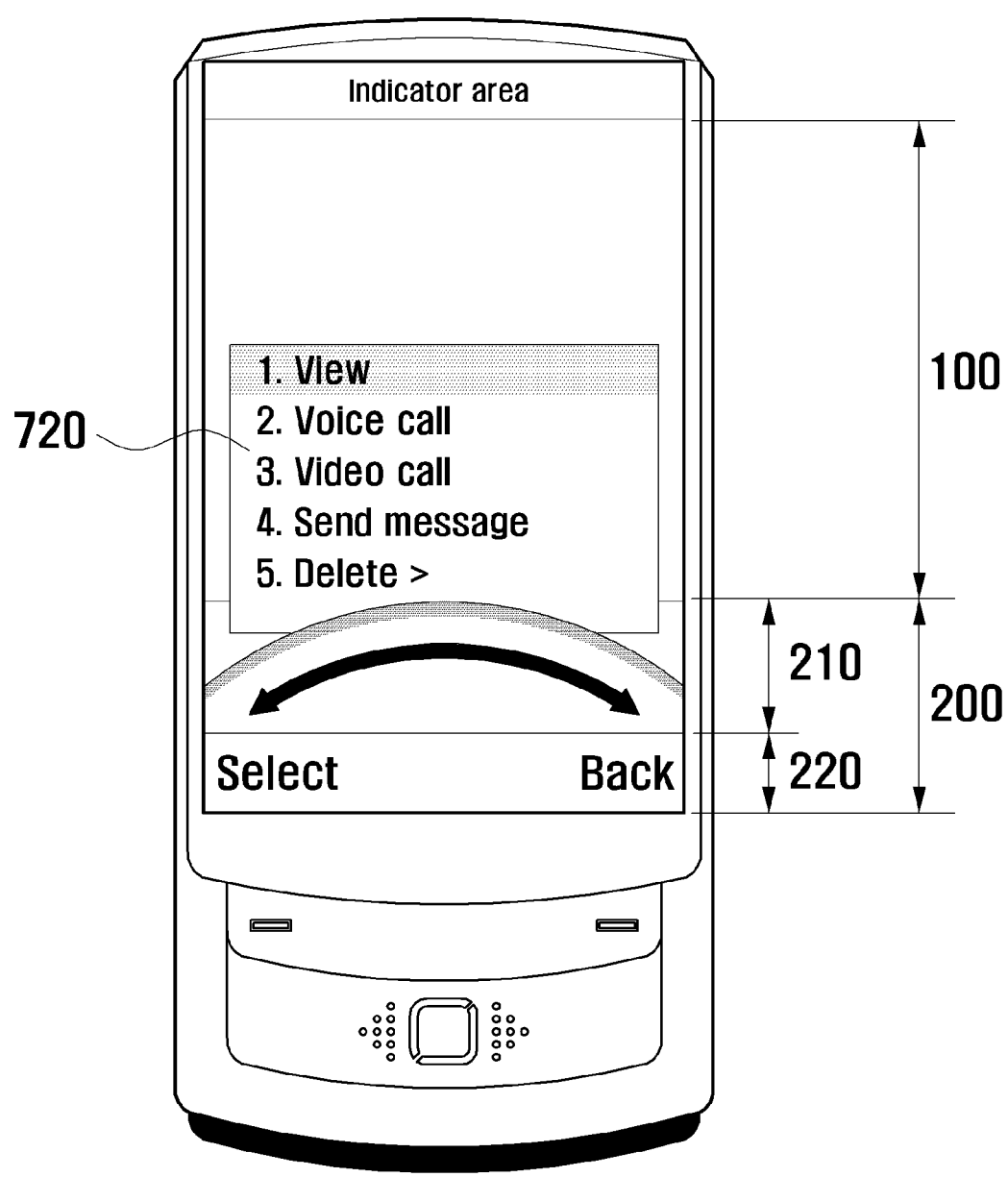
Figure 7C:
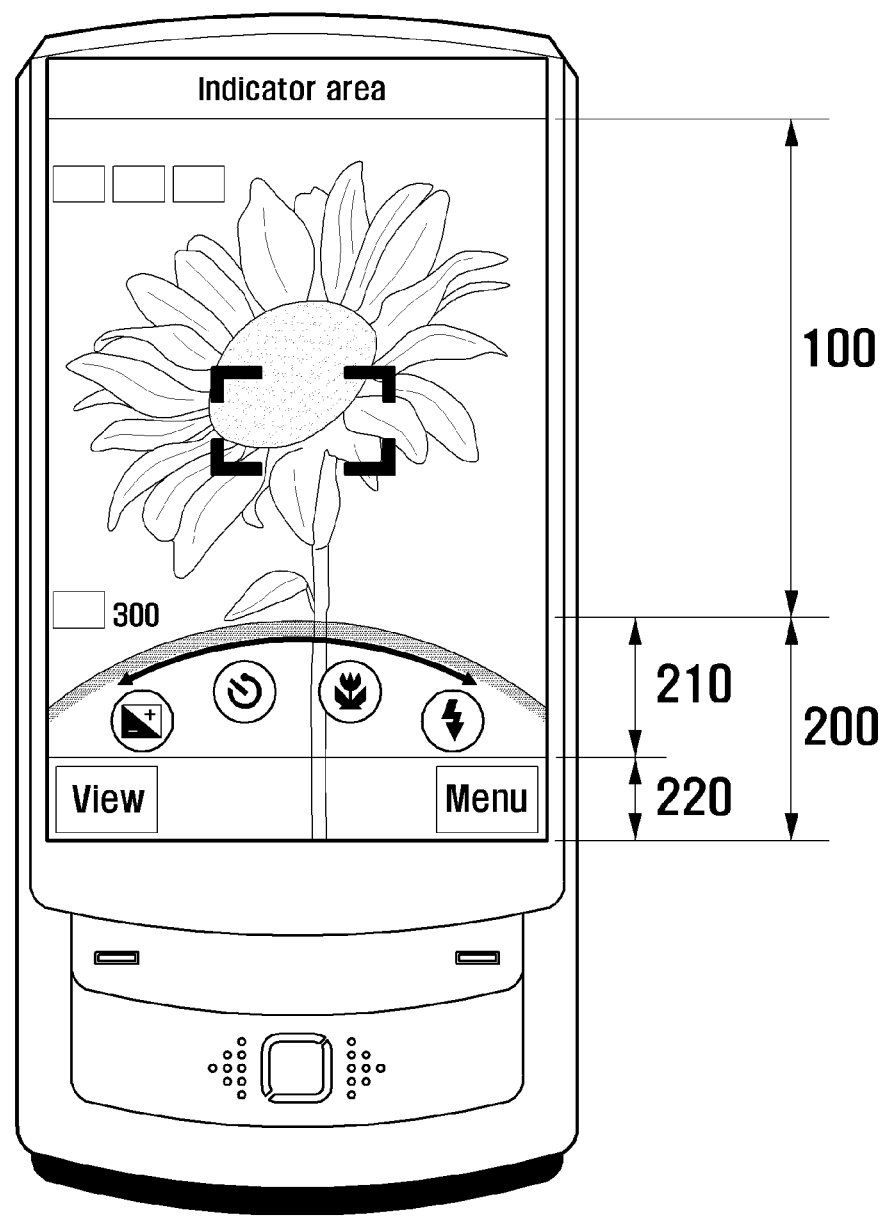

FIG. 7A, FIG. 7B, and FIG. 7C show exemplary screen embodiments that allow object navigation in response to user interaction in a portable terminal 10. FIG. 7A shows an exemplary screen embodiment providing a menu list through the output area 100. FIG. 7B shows an exemplary screen embodiment that provides a particular pop-up window 720 through the output area 100. FIG. 7C shows an exemplary screen embodiment that provides screen data obtained by a camera function through the output area 100.

FIG. 7A shows a screen that corresponds to performing navigation by user interaction when a particular menu list is provided through the output area 100. As shown in FIG. 7A, by generating a sweep event in the control area 200, a user can perform navigation between objects in the menu list provided in the output area 100. The navigation can be performed based on the direction of progress of the sweep event.

The screen shown in FIG. 7B corresponds to performing navigation through user interaction when a particular pop-up window 720 is provided through the output area 100. The pop-up window 720 may include various pop-up windows such as an option pop-up window or a setting pop-up window corresponding to an application being currently executed. As shown in FIG. 7B, by generating a sweep event in the control area 200, a user can perform navigation between objects within the pop-up window 720 displayed in the output area 100. The navigation can be performed based on the direction of progress of the sweep event so that individual items in the pop-up window 720 may be accessed.

FIG. 7C shows an exemplary embodiment where the user is performing a Zoom In/Out function through user interaction when screen data (here, an image data of a photographed flower) obtained by a camera function is displayed in the output area 100. By generating a sweep event in the control area 200, a user can perform the Zoom In/Out function of the screen data provided in the output area 100. The Zoom In/Out function can be performed based on the direction of propagation of a user's sweep event.

The user may increment or decrement a value in relation to an application being executed through user interaction according to a sweep event of a user in the control area 200. A value may be increased or decreased such as the Zoom In/Out value as shown in FIG. 7C. Likewise, values related to multimedia reproduction applications such as Volume High/Low may also be increased or decreased in response to user interactions.

Figure 8A:
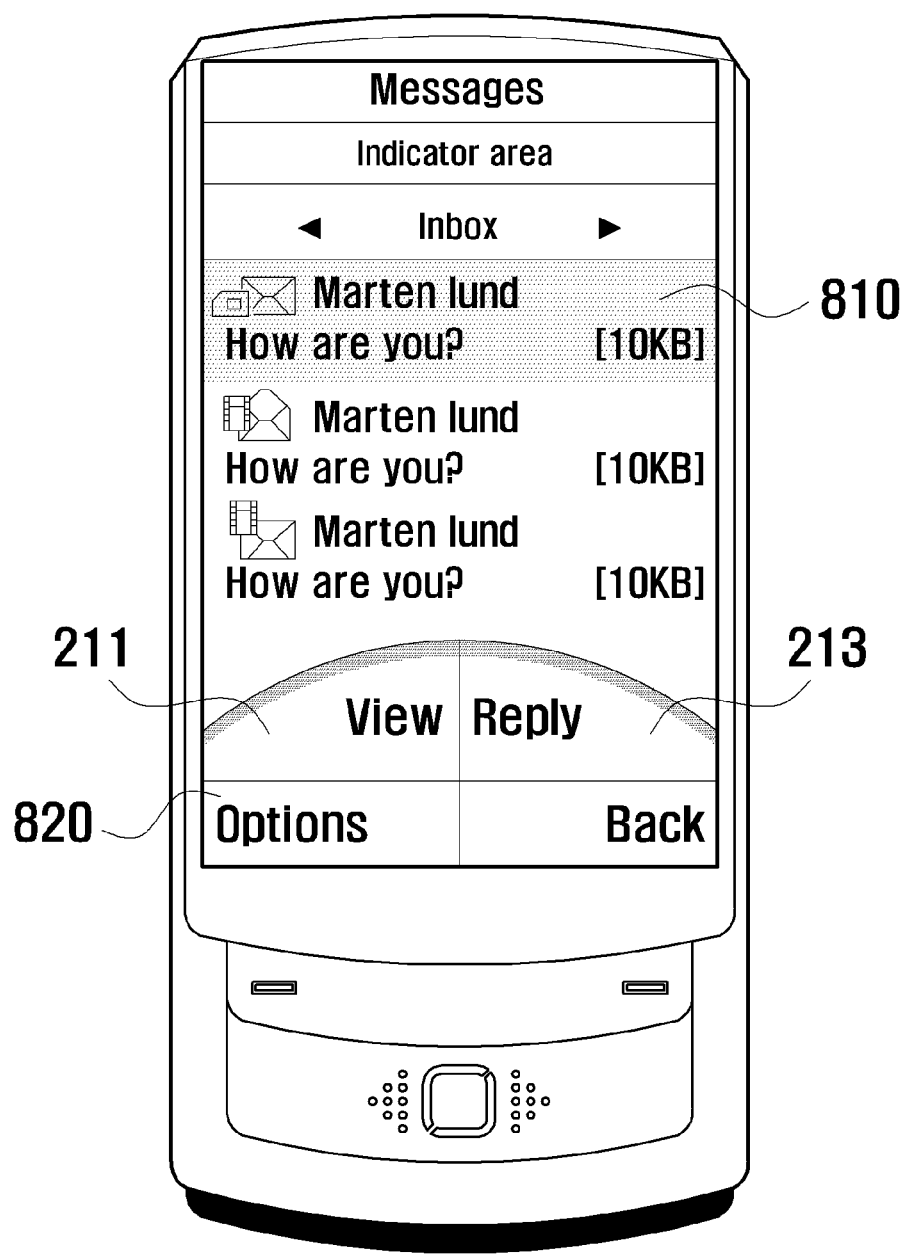
FIG. 8A, FIG. 8B, and FIG. 8C show exemplary screens providing option commands in response to user interactions in a portable terminal according to exemplary embodiments of the present invention.
Figure 8B:
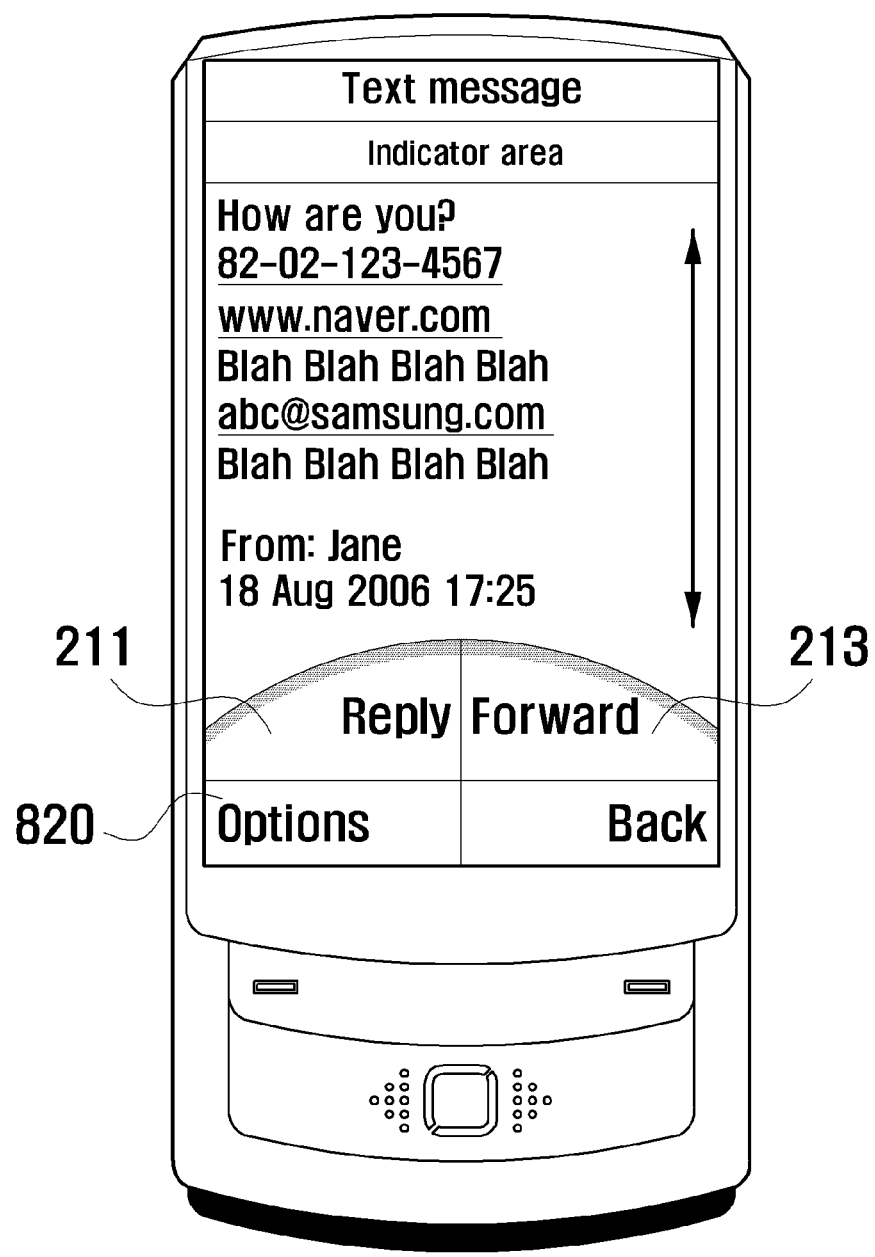
Figure 8C:
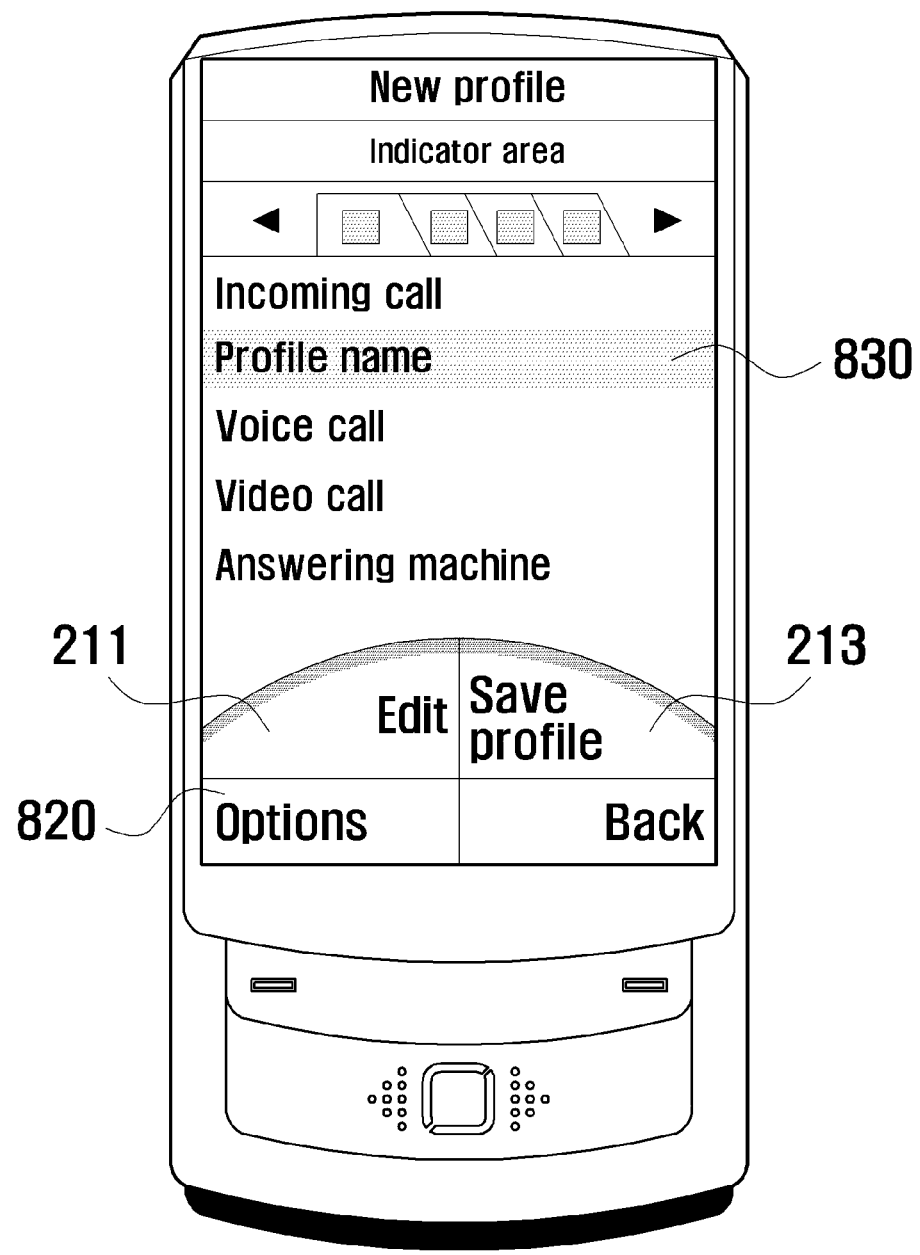

FIG. 8A, FIG. 8B, and FIG. 8C show exemplary screens providing option commands in response to a user interaction in a portable terminal 10 according to exemplary embodiments of the present invention.

FIG. 8A shows an exemplary screen embodiment providing a particular content list with members such as item 810 through the output area 100. FIG. 8B shows an exemplary screen embodiment providing a particular content view through the output area 100. FIG. 8C shows an exemplary screen embodiment providing a particular setting menu having members such as item 830 through the output area 100.

FIG. 8A shows an exemplary embodiment that corresponds to a case of performing an option command according to user interaction when a particular content list is provided through the output area 100. The screen shown in FIG. 8A provides a message list. As shown, the option commands allocated to the tap point 211 and tap point 213 of the wheel area 210 in accordance with the content list are "view" and "reply". By generating a tap event on a tap point allocated with an option command from among the tap point 211 or tap point 213 in the wheel area 210, the user can perform an option command in relation to a particular item in the content list provided in the output area 100. For example, the portable terminal 10 can display a message as indicated by reference numeral 810 when the user generates a tap event on the tap point 211 or can display a screen for writing a reply to the message indicated by reference numeral 810 when the user generates a tap event on the tap point 213. to performing an option command according to a user interaction when a particular content view is provided through the output area 100. The output area 100 shown in FIG. 8B displays (message) contents of item 810 from the content list of FIG. 8A. Further, the control area 200 in FIG. 8B shows the option commands allocated to the tap points 211 and 213 of the wheel area 210 in accordance with the content view are "reply" and "Forward", respectively.

As shown in FIG. 8B, by generating a tap event on a tap point allocated with a desired option command of the tap point 211 or tap point 213 in the wheel area 210, the user can perform the option command in relation to the content view provided in the output area 100. For example, as shown in FIG. 8B, the portable terminal 10 can display screen data for writing a reply to the content view when the user generates a tap event on the tap point 211 or can display screen data for writing a forward message with contents of the content view when the user generates a tap event on the tap point 213.

The exemplary screen embodiment shown in FIG. 8C corresponds to performing an option command according to user interaction when a particular setting menu is provided through the output area 100. Output area 100 displays a setting menu in relation to an incoming call. In the control area 200, the option commands allocated to the tap point 211 and tap point 213 of the wheel area 210 in accordance with the setting menu are "edit" and "save profile," respectively.

As shown in FIG. 8C, by generating a tap event on a tap point allocated with a desired option command from among the tap point 211 and tap point 213 in the wheel area 210, the user can perform the option command in relation to a particular item in the setting menu provided in the output area 100. For example, as shown in FIG. 8C, the portable terminal 10 can display screen data allowing editing of the item 830 when the user generates a tap event on the tap point 211 or can perform an option command for saving a profile in the setting menu when the user generates a tap event on the tap point 213.

In allocating the option commands as described above with reference to FIG. 8A, FIG. 8B, and FIG. 8C, particular option commands having various priorities may be allocated to the tap point 211 and tap point 213 of the wheel area 210 in accordance with the screen data associated with the execution application displayed in the output area 100. The priorities of the option commands may be either provided according to a setting of a user or a provider or determined according to a use frequency obtained by counting the number of uses of a particular option command in the application.

Further, as shown in FIG. 8A, FIG. 8B, and FIG. 8C, soft keys allocated with an option command may be provided in the form of a GUI to the soft key area 220 of the control area 200. The GUI corresponding to a soft key may change in response to the execution application. In the exemplary screen embodiments shown in FIG. 8A, FIG. 8B, and FIG. 8C, the "Options" soft key 820 displayed in the soft key area 220 capable of producing an action whereby a corresponding menu of choices is displayed in the output area 100. For example, when a tap event occurs on the "Options" soft key 820, the portable terminal 10 can provide a pop-up list, which includes option commands including "view", "reply", "forward", "edit", "save profile", "video call", "send message", "save", "change type", and "change" and option commands corresponding to the currently executed application.

Figure 9A:
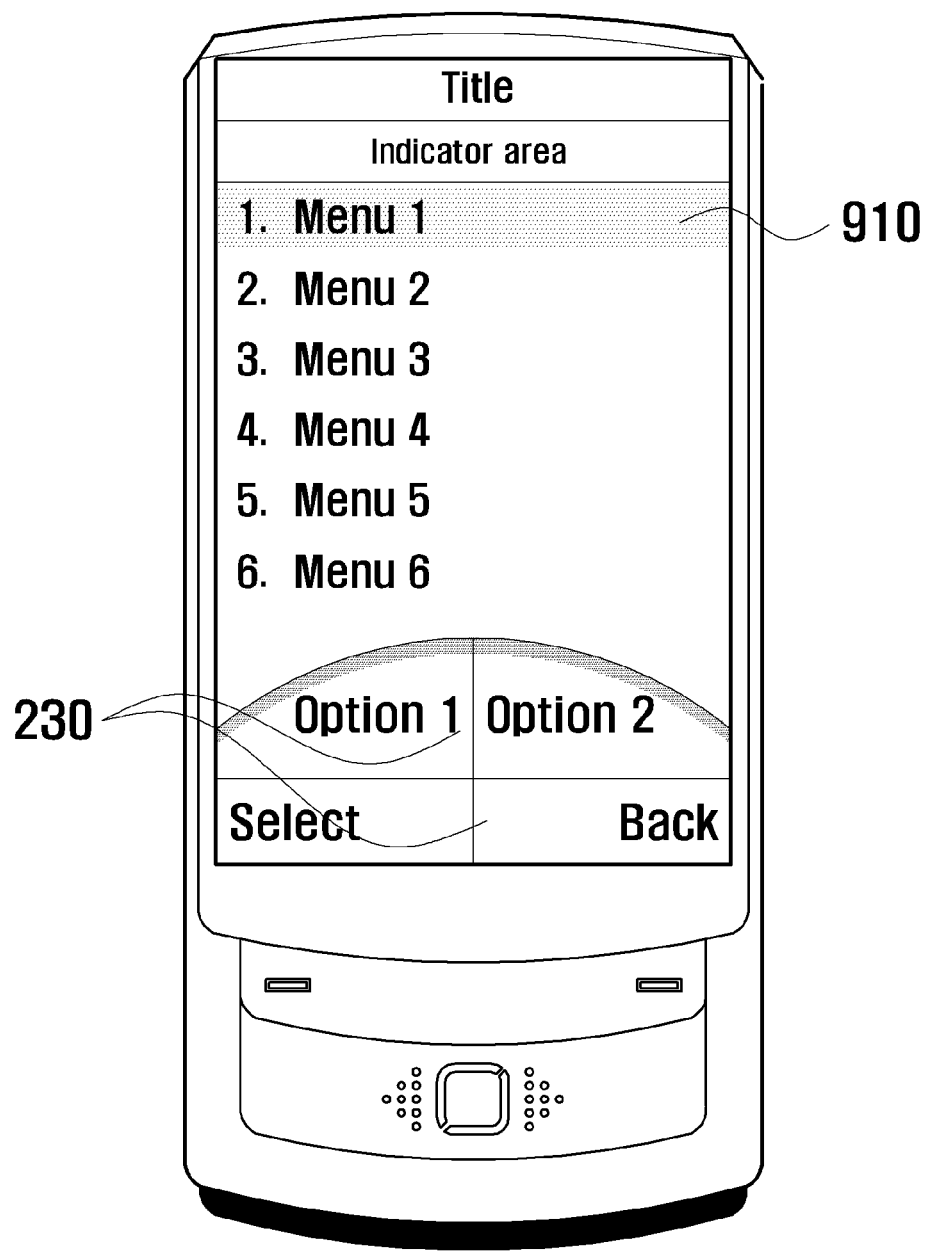
FIG. 9A, FIG. 9B, and FIG. 9C show exemplary screens for execution of an object selected through user interaction in a portable terminal according to exemplary embodiments of the present invention.
Figure 9B:
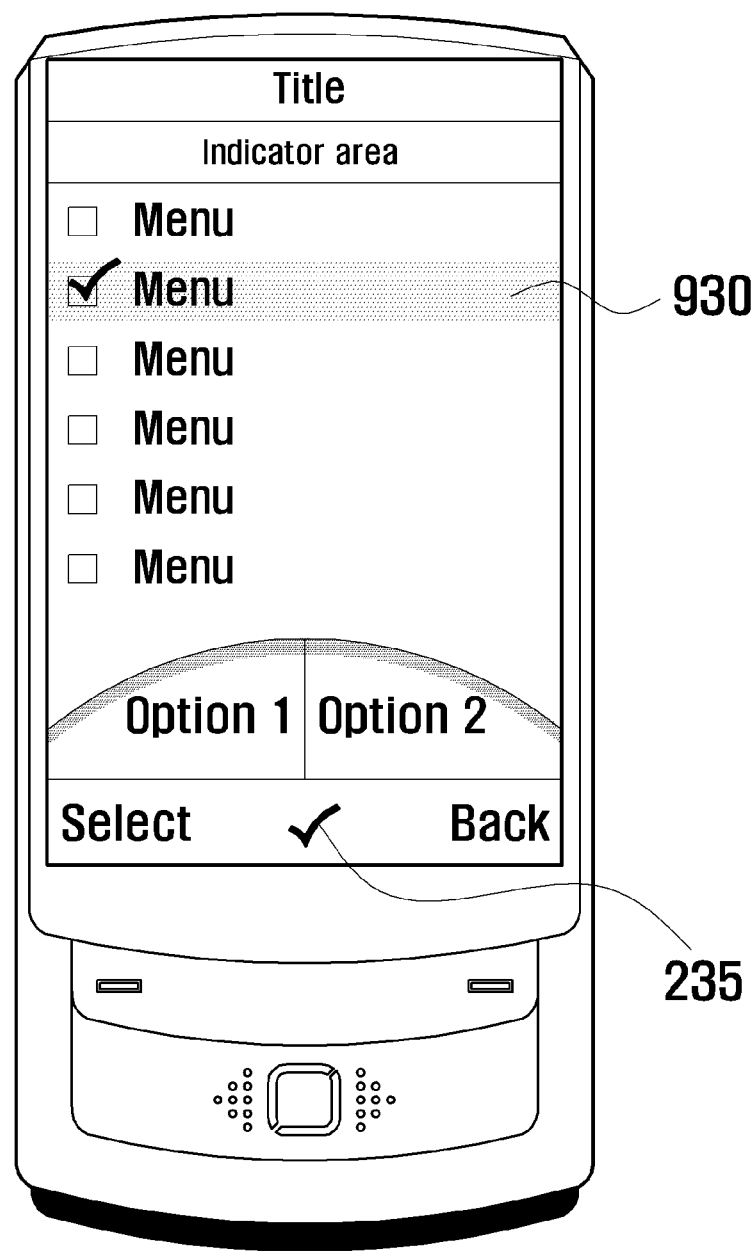
Figure 9C:
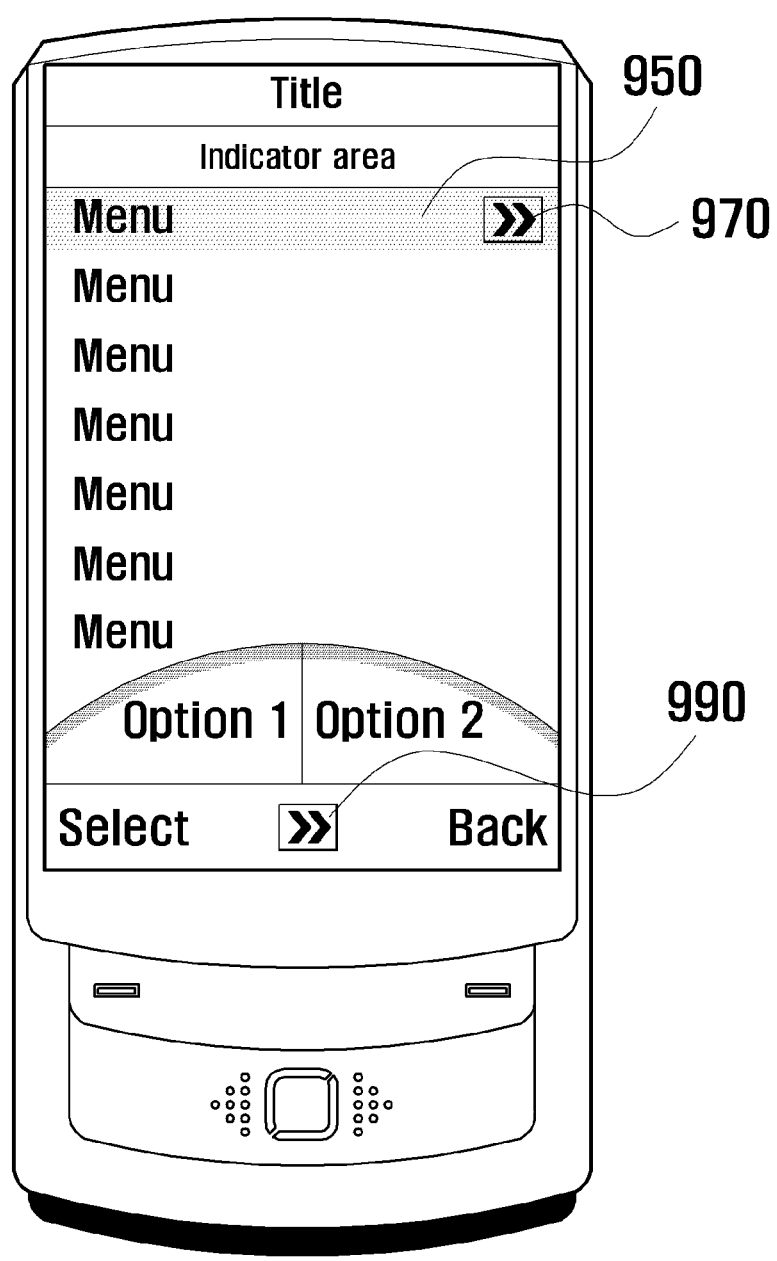

FIG. 9A, FIG. 9B, and FIG. 9C show exemplary screen embodiments for execution of an object selected through user interaction in a portable terminal 10. The exemplary screen embodiments shown in FIG. 9A, FIG. 9B, and FIG. 9C correspond to menu lists displayed in the output area 100.

In the exemplary screen embodiment shown in FIG. 9A, a menu list from which a user can select a particular menu is provided, and a particular object can be executed through user interaction. By generating a tap event on a tap point (selection area) 230 allocated with a selection or execution function in the wheel area 210 or the soft key area 220 of the control area 200, the user can issue an execution command for a particular item in the menu list provided in the output area 100. For example, as shown in FIG. 9A, when the user generates a tap event on one tap point 230, the portable terminal 10 can execute detailed contents of the item 910 or an application corresponding to the item 910 and display screen data according to the application.

The exemplary screen embodiment shown in FIG. 9B provides a menu list from which a user can select multiple menus, so that it is possible to execute at least one object through user interaction. By generating a tap event on a tap point (selection area) 230 allocated with a selection or execution function in the control area 200, the user can issue a command for selection of at least one item from the menu list provided in the output area 100. For example, when the user generates a tap event on the tap point 235, the item 930 is selected, and the portable terminal 10 can display a screen showing that the item 930 has been selected.

When one or more items in the menu list shown in FIG. 9B are selected, the screen can display an item as indicated by reference numeral 235 such as a checked box, ☑, or a check, ✓, that enables the user to intuitively recognize the selection. Such check items can be either provided or omitted according to the execution application and the type of screen data provided in the output area 100.

The exemplary screen embodiment shown in FIG. 9C provides a menu list within which a particular item includes at least one sub-menu item or detailed contents (hereinafter referred to as "sub-menu" as an example) so that the sub-menu of the particular item is executed when the particular item is selected. By generating a tap event on a tap point (selection area) 230 allocated with a selection/execution function in the control area 200, the user can issue a command for execution of a particular item in the menu list provided in the output area 100. For example, as shown in FIG. 9C, when the user generates a tap event on a tap point from among the tap points 230, the portable terminal 10 can display a screen corresponding to the sub-menu of the item 950.

When an item in the menu list shown in FIG. 9C includes a sub-menu and the item is selected, the screen shown in FIG. 9C can display a special indicator that allows the user to intuitively recognize the existence of the sub-menu. In FIG. 9C the special indicator may be displayed as item 970 near the activated predetermined item or as item 990 in the control area 200. The indicators 970 and 990 may be provided or omitted according to the type of the screen data displayed in the output area 100 or the execution application.

Figure 10A:
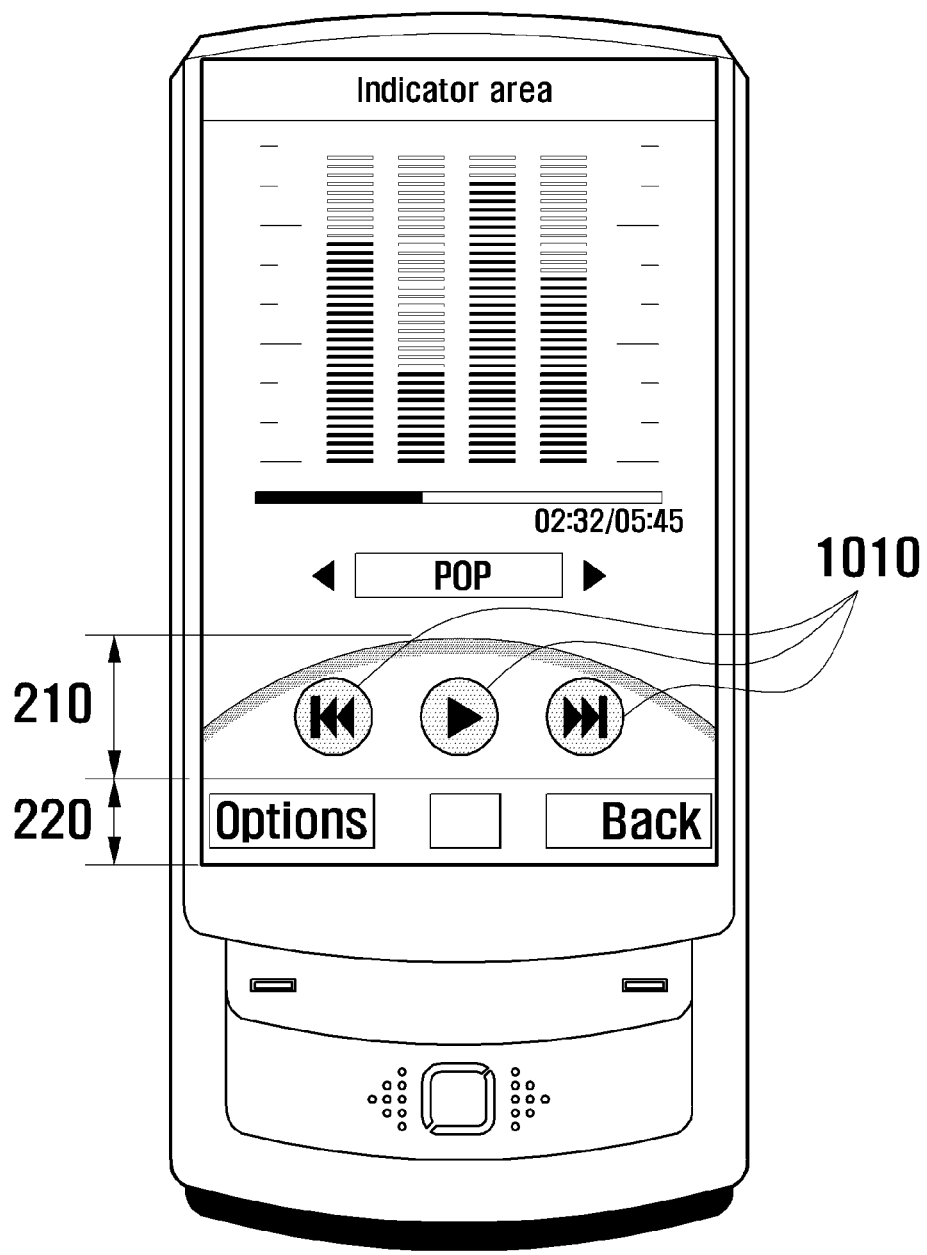
FIG. 10A, FIG. 10B, and FIG. 10C show exemplary screens providing a quick link function according to user interaction in a portable terminal according to exemplary embodiments of the present invention.
Figure 10B:
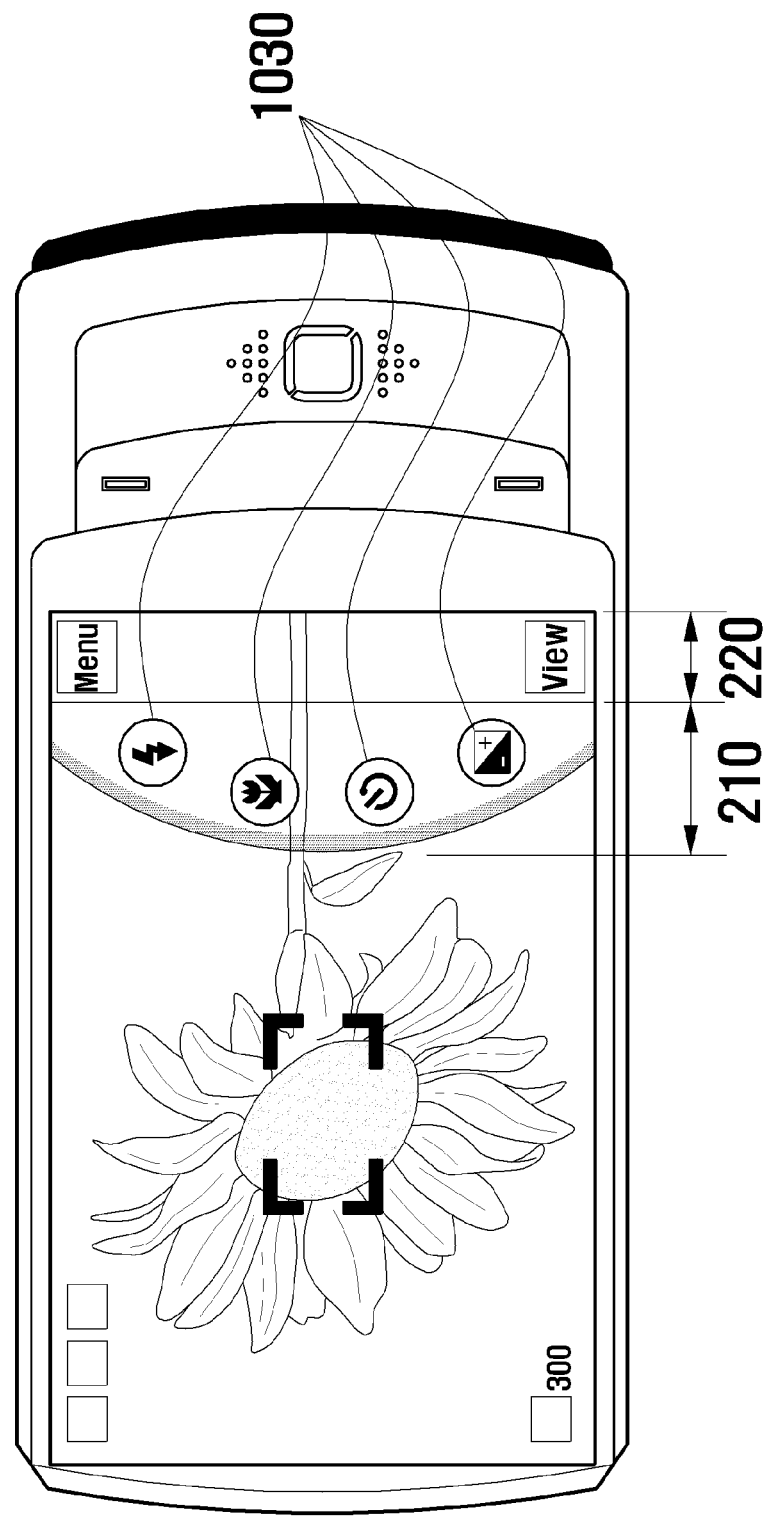
Figure 10C:
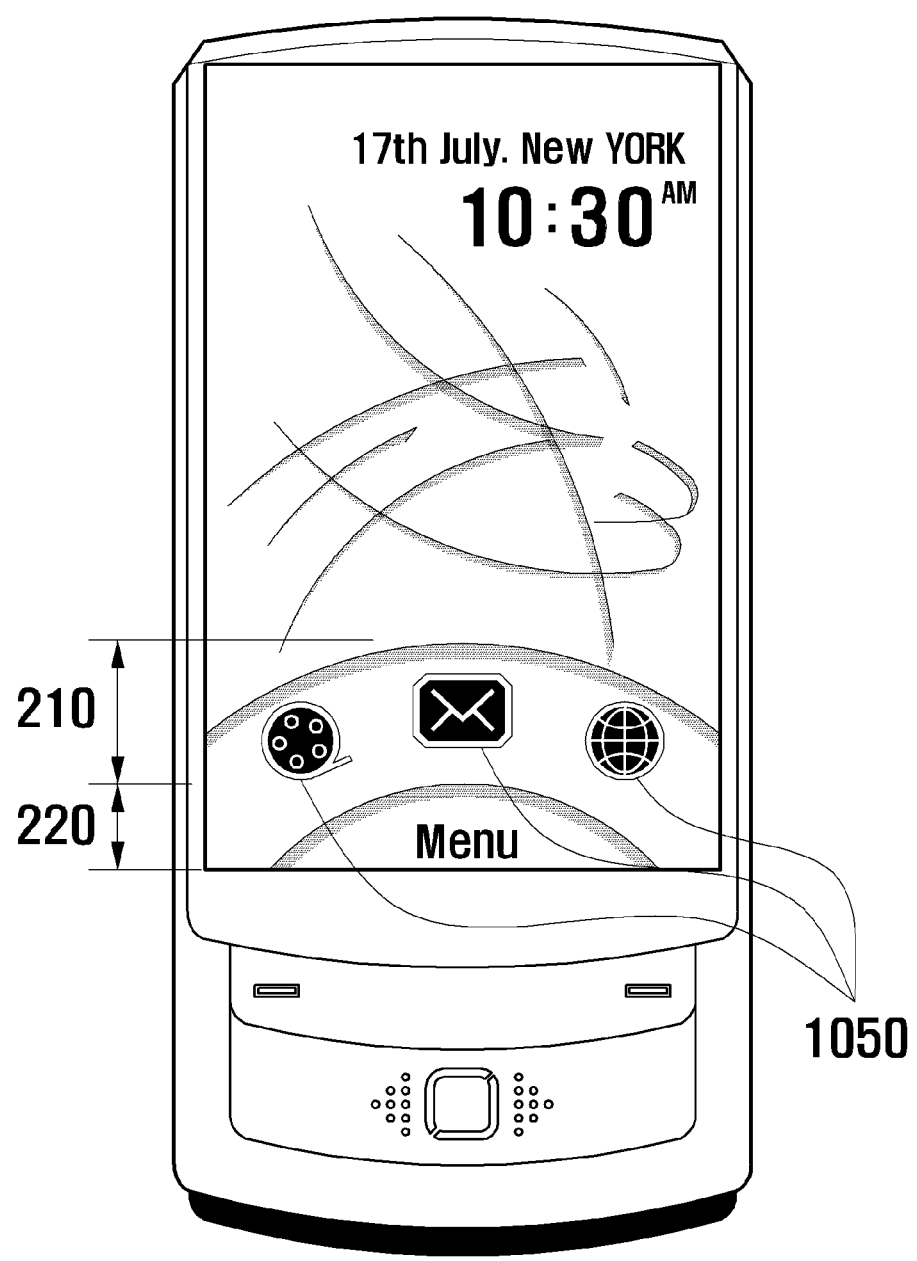

FIG. 10A, FIG. 10B, and FIG. 10C show exemplary screen embodiments that provide a quick link function according to a user interaction in a portable terminal 10. FIG. 10A shows an exemplary screen embodiment for execution of an application such as a music player. FIG. 10B shows an exemplary screen embodiment for execution of an application such as a camera function. FIG. 10C shows an exemplary screen embodiment providing a virtual item to which a particular application is mapped.

In the exemplary screen embodiment shown in FIG. 10A, screen data for playing a music player is provided through the output area 100, and a virtual item 1010 of a GUI corresponding to the music player is provided through the control area 200. In the control area 200, the wheel area 210 and the soft key area 220 may provide a virtual item 1010 in relation to a multimedia item reproduction control function of a music player. By generating a tap event on a virtual item 1010 allocated with a function control desired by the user from among the virtual items 1010, the user can instantly perform the function control in relation to the reproduction of the multimedia item. The user can generate an interaction for increasing or decreasing a value of the multimedia item such as an interaction for controlling the volume. For example, by generating a sweep event in the control area 200, especially in the wheel area 210, the user can control the volume.

In this way, the portable terminal 10 can identify a virtual item 1010 in relation to a tap event occurring in the control area 200 and execute a function mapped to the virtual item 1010. Further, in response to a sweep event generated in the control area 200, the portable terminal 10 can increase or decrease the value corresponding to the execution application.

In the exemplary screen embodiment shown in FIG. 10B, screen data (here, image data of a photographed flower object) according to execution of the camera function is provided through the output area 100, and a virtual item of a GUI corresponding to the camera function is provided through the control area 200.

As shown in FIG. 10B, the control area 200, for example the wheel area 210 or the soft key area 220, may provide a virtual item 1030 in relation to control of the camera function. By generating a tap event on a virtual item 1030 allocated with a function control associate with the virtual items 1030, the user can instantly perform the function control in relation to the control of the camera function. The user can also generate an interaction for increasing or decreasing a value of the camera function such as an interaction for controlling the Zoom In/Out. For example, by generating a sweep event in the control area 200, especially in the wheel area 210, the user can control the Zoom In/Out value.

In this way, the portable terminal 10 can identify a virtual item 1030 in relation to a tap event occurring in the control area 200 and execute a function mapped to the virtual item 1030. Further, in response to a sweep event generated in the control area 200, the portable terminal 10 can increase or decrease a value corresponding to the execution application.

In the exemplary screen embodiment shown in FIG. 10C, screen data according to a particular application such as the displayed standby screen is provided through the output area 100, and a virtual item 1050 of a GUI corresponding to the particular application is provided through the control area 200. The control area 200 including the wheel area 210 and the soft key area 220 may provide at least one virtual item 1050 to which the particular application has been mapped. By generating a tap event on a virtual item 1050 allocated with an application desired by the user from among the virtual items 1050, the user can instantly perform the desired application mapped to the virtual item 1050.

The portable terminal 10 can identify the virtual item 1050 in relation to the tap event occurring in the control area 200, for example in the wheel area 210, and execute a function mapped to the virtual item 1050 and display screen data according to the function.

Figure 11:
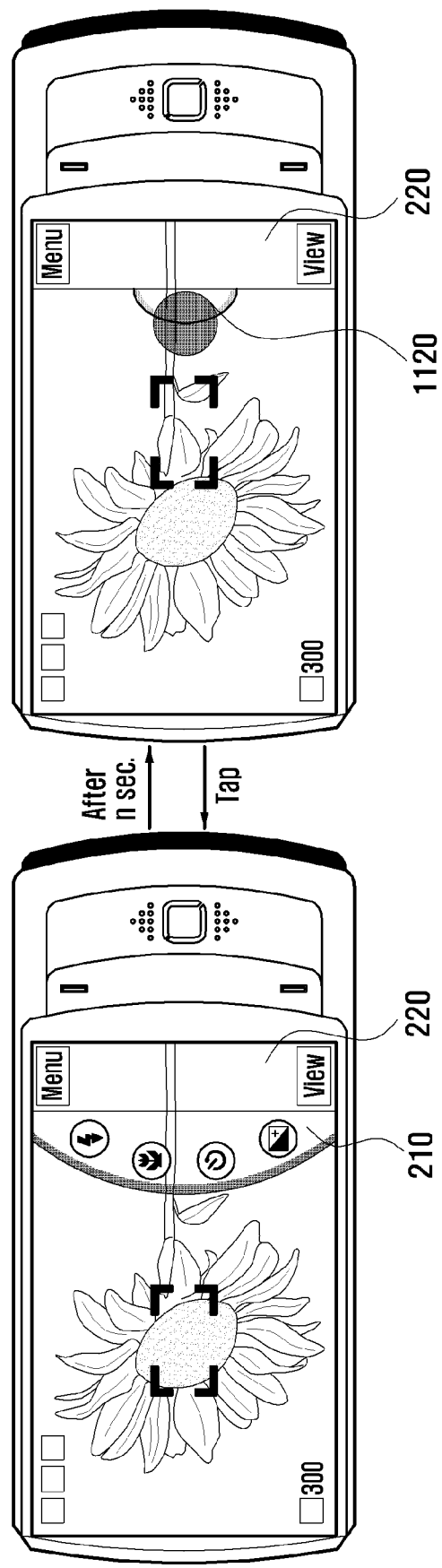
FIG. 11, FIG. 12, and FIG. 13 show exemplary screens for showing display types of a control area in a portable terminal according to exemplary embodiments of the present invention.
Figure 12:
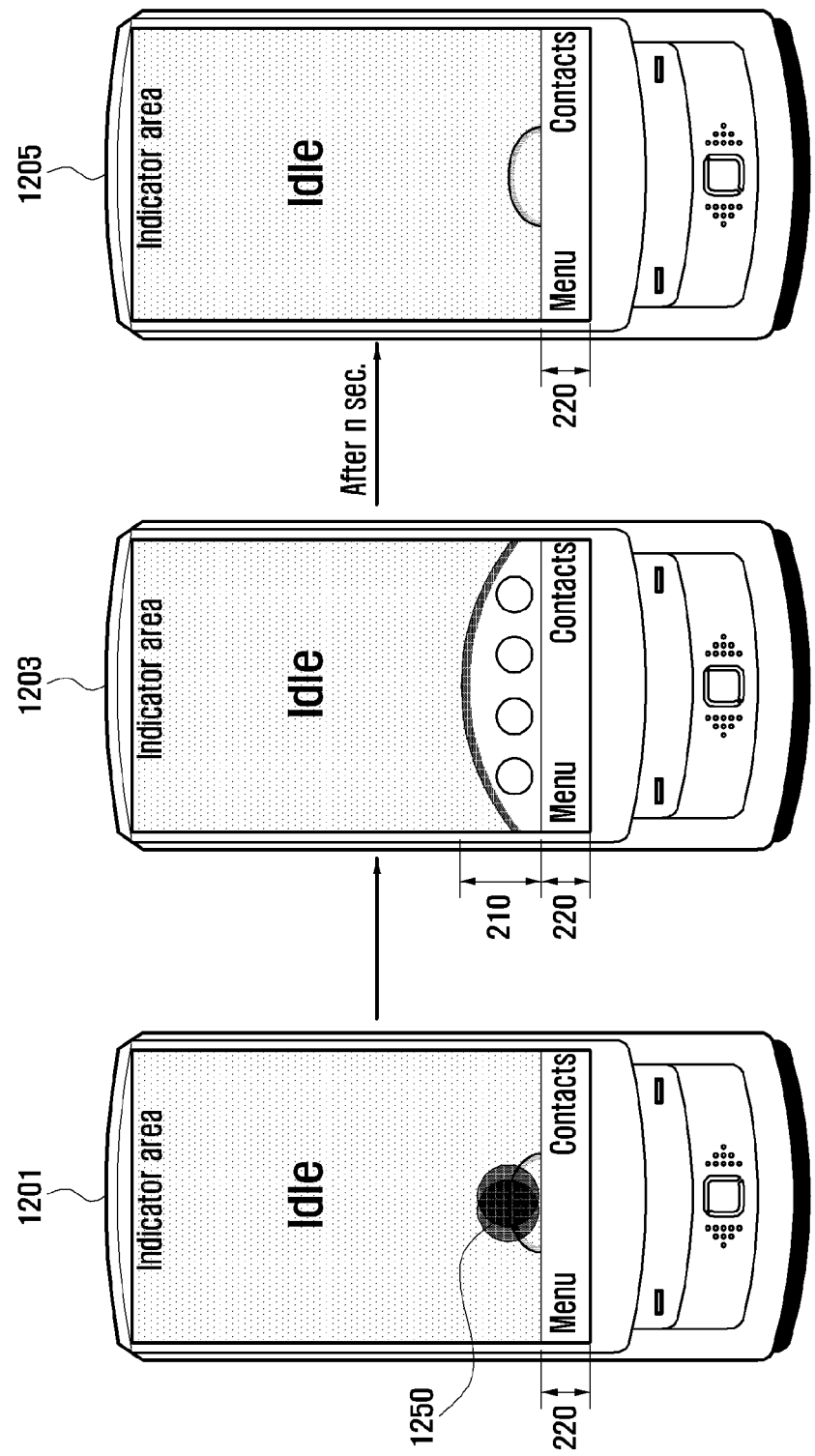
Figure 13:
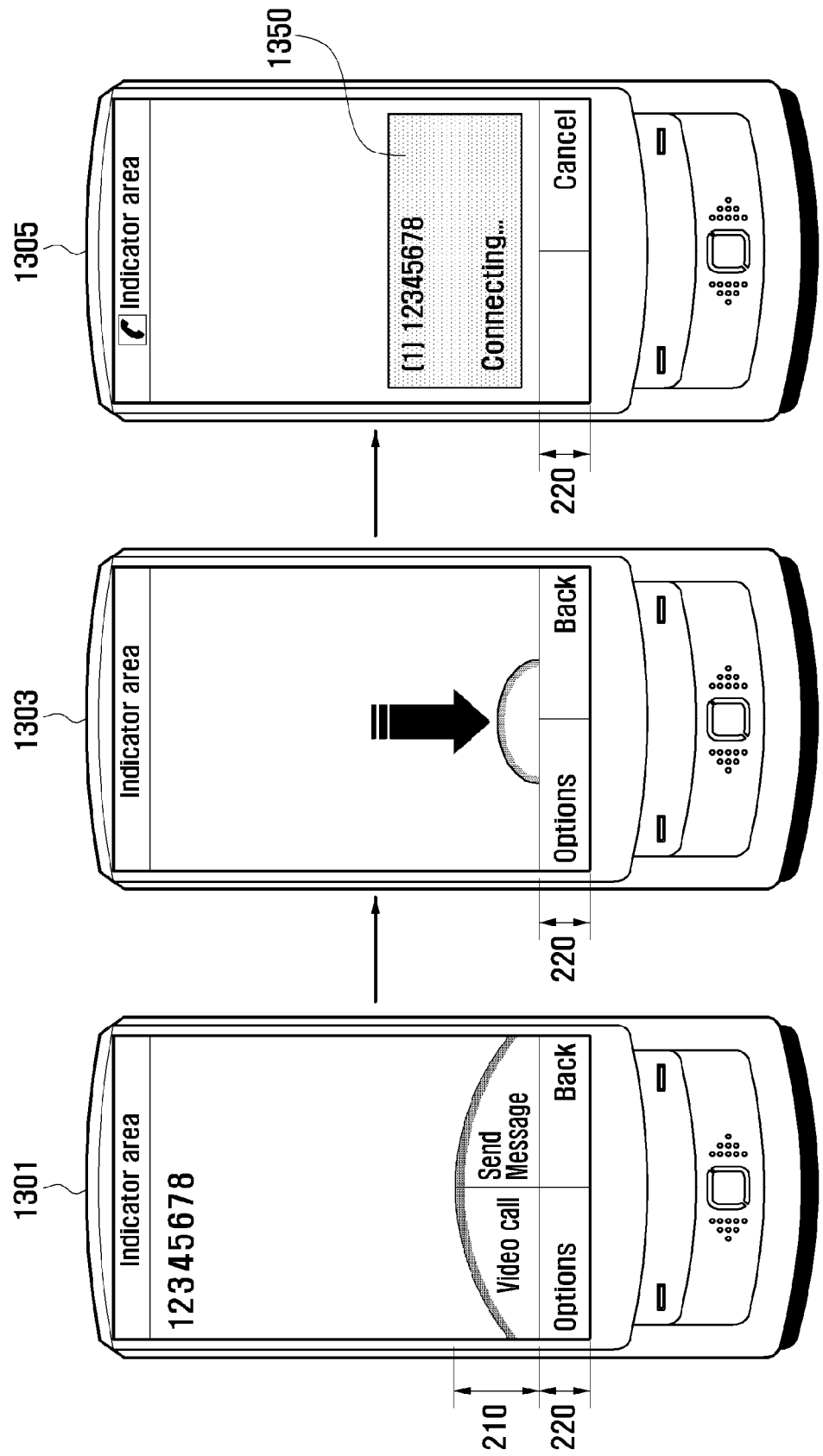

FIG. 11, FIG. 12, and FIG. 13 show exemplary screen embodiments for various display types of a control area 200 in a portable terminal 10. FIG. 11 shows an exemplary screen embodiment providing a control area 200 according to execution of a particular application. FIG. 12 shows an exemplary screen embodiment providing a control area 200 in an idle screen. FIG. 13 shows an exemplary embodiment screen providing a control area 200 at the time of executing a function according to an option command.

The display type shown in FIG. 11 corresponds to providing the control area 200 when a camera application is executed. When a camera application is executed, screen data (here, image data of a photographed flower object) according to execution of the camera function is provided through the output area 100, and a virtual item of a GUI sat according to the camera application is provided through the control area 200.

The user can control various functions relating to the camera function through the control area 200. When there is no interaction from the user within a preset period of time after the portable terminal 10 provides the screen data according to the execution of the camera application or when there is not another user interaction within a preset period of time after a previous user interaction using the control area 200, the portable terminal 10 may perform an operation that hides the control area 200 when the preset period of time has elapsed.

Alternatively, the portable terminal 10 can maintain display of the soft key area 220 while hiding the wheel area 210 in the control area 200 as shown in FIG. 11. Also, the portable terminal 10 may either hide all of the wheel area 210 or display a GUI 1120 representing the wheel area 210 for user's recognition while hiding the wheel area 210. After hiding the wheel area 210, the portable terminal 10 can redisplay the wheel area 210 when a user interaction, for example a tap event or a double tap event, occurs in the GUI 1120.

The display type shown in FIG. 12 corresponds to providing the control area 200 in a standby mode or displaying an idle screen. An idle screen is provided through the output area 100, and the wheel area 210 from among the control area 200 is hidden. Thereafter, when a user interaction, for example a tap event or a double tap event, occurs on the GUI 1250 as shown in the screen 1201, the portable terminal 10 displays the wheel area 210 as displayed in the screen 1203. The wheel area 210 may provide at least one GUI to which particular applications are mapped. If no user interaction occurs within a preset time interval, the portable terminal 10 may hide the wheel area 210 again and provide the GUI 1250 representing the wheel area 210 when the preset time interval elapses as shown in the screen 1205.

The display type shown in FIG. 13 corresponds to an exemplary embodiment that provides the control area 200 when an application, such as a call connection application, is executed.

When a call connection application is executed, screen data for dialing is displayed in the output area 100, and a virtual item of a GUI sat according to the call connection application is provided through the control area 200.

The user can control various functions relating to the call connection application through the control area 200. After the portable terminal 10 provides the screen data according to the execution of the call connection application, the portable terminal 10 may display a phone number corresponding to input from the user as shown in the screen 1301. After the input of the phone number by the user according to execution of the call connection application, the portable terminal 10 may hide the control area 200 as shown in the screen 1303.

The portable terminal can maintain display of the soft key area 220 while hiding the wheel area 210 from the control area 200. Thereafter, as shown in the screen 1305, the portable terminal 10 can display an object, such as a pop-up window 1350, associated with the execution of the dialing function in the control area 200. By displaying the object 1350 in the control area 200, such as in the hidden wheel area 210, the portable terminal 10 can avoid hiding the screen data provided in the output area 100, allowing the user an unobscured field of view. The operation of displaying a pop-up window 1350 will be described in more detail with reference to the drawings.

When the wheel area 210 is hidden with reference to FIG. 11, FIG. 12, and FIG. 13, the screen data provided through the output area 100 may be extended beyond the output area 100 into the wheel area 210. The extent of the extension depends on the execution application and user settings. For example, when a menu list is provided and the wheel area 210 is hidden, the items originally located within the lowermost part of the menu list may be moved to the wheel area 210 or the wheel area 210 may be left as a blank space. Further, the screen data of the output area 100 may be provided together with the control area 200 according to the execution application. For example, when the screen data according to the camera function as shown in FIG. 11 is displayed, the display space of the screen data may extend into the control area 200 to provide an unobscured field of view. The control area 200 may be located higher than and coextensive with the screen data.

Figure 14:
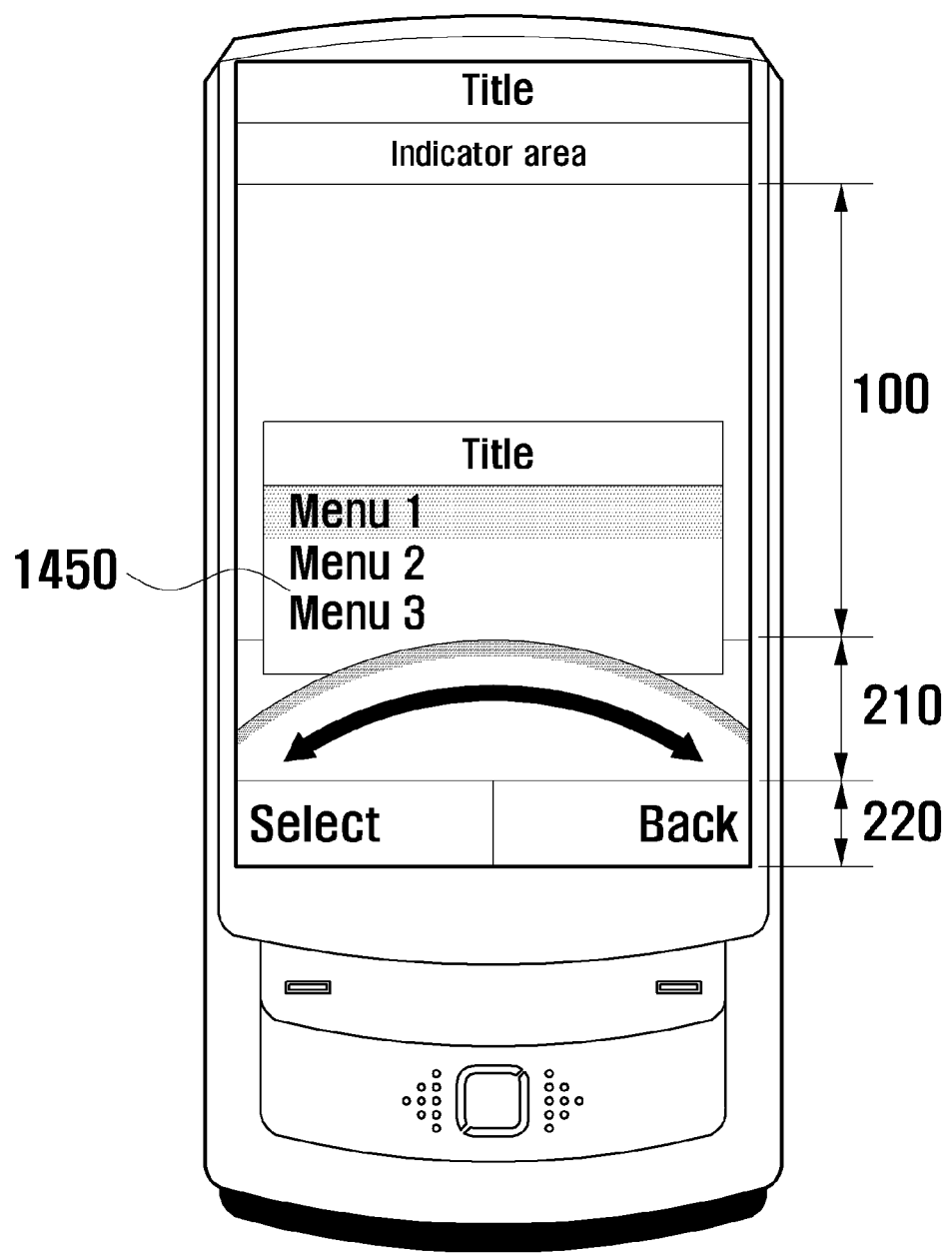
FIG. 14 and FIG. 15 show exemplary screens for showing various types of pop-up windows provided in a portable terminal according to exemplary embodiments of the present invention.
Figure 15:
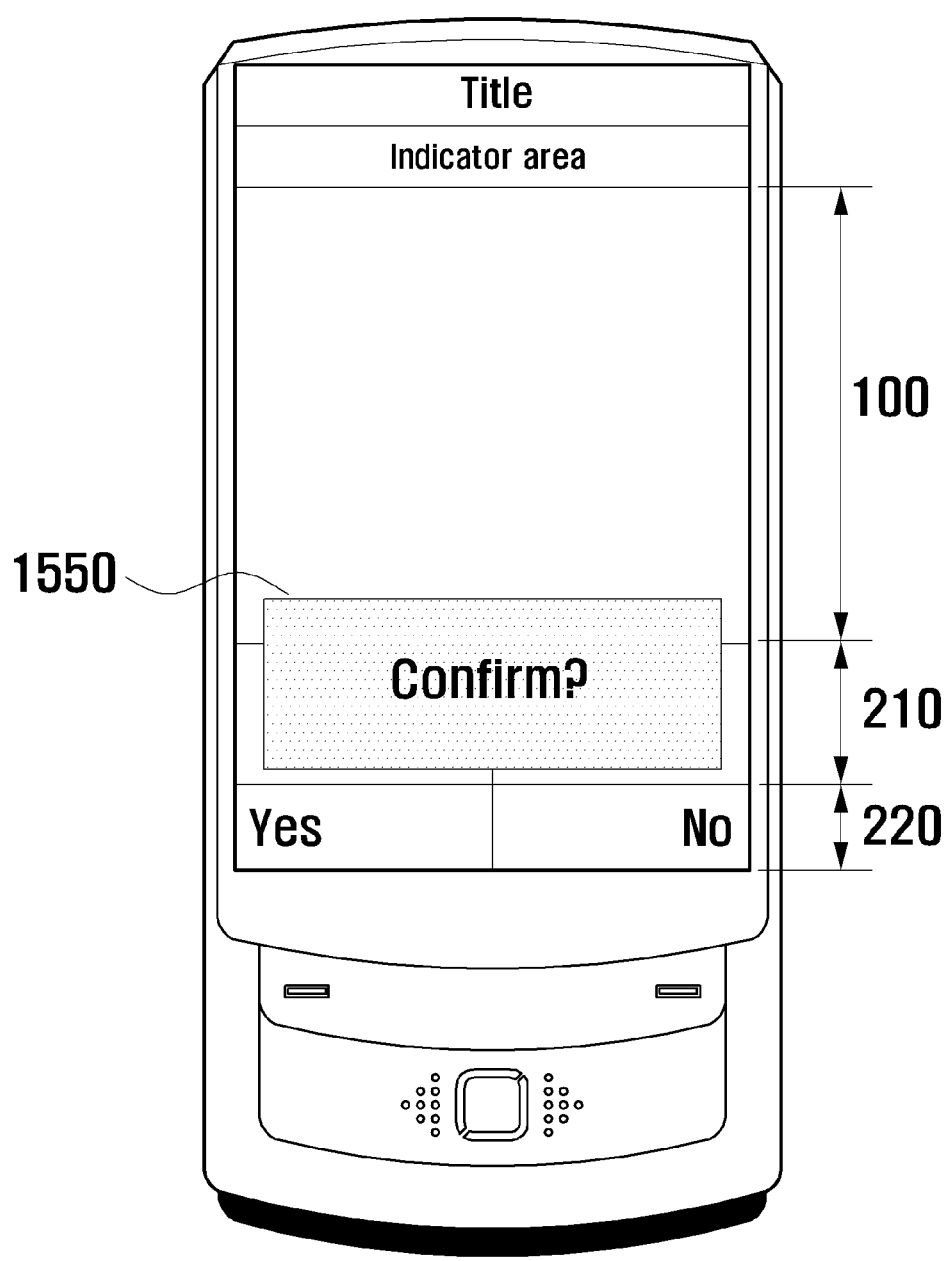

FIG. 14 and FIG. 15 show exemplary screen embodiments for showing types of pop-up windows provided in a portable terminal 10.

In the display screen shown in FIG. 14, a pop-up window 1450 is disposed near the upper portion of the wheel area 210 in the control area 200. This positioning of pop-up window 1450 may occur when the pop-up window 1450 requires scrolling or navigation or when a pop-up window is used to notify the user of information.

In the display screen shown in FIG. 15, a particular pop-up window 1550 is disposed in the wheel area 210 near the upper portion of the soft key area 220 in the control area 200. This position of the pop-up window 1550 may occur if the pop-up window 1550 is used to notify the user of information or an application requires user confirmation of a selection such as "YES" and "NO" alternatives.

As shown in FIG. 14 and FIG. 15, by providing a pop-up window 1450 or 1550, respectively, in the control area 200, the portable terminal 10 allows a user to secure an unobstructed view of the screen data in output area 100. As a result, the user can easily recognize a pop-up window in the control area 200 while identifying the screen data in the output area 100.

Figure 16:
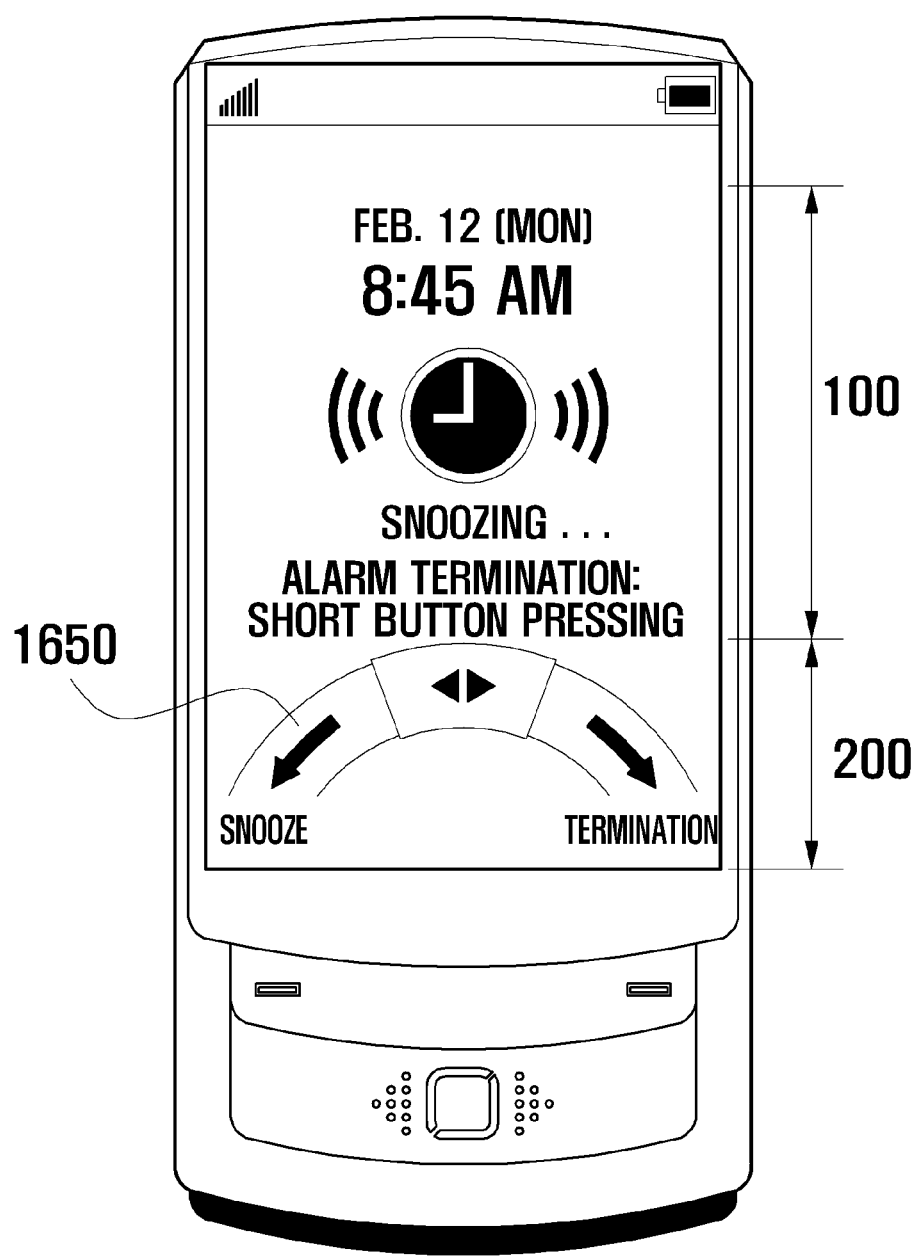
FIG. 16 and FIG. 17 show exemplary screens of GUIs provided in a control area of a portable terminal according to exemplary embodiments of the present invention.
Figure 17:
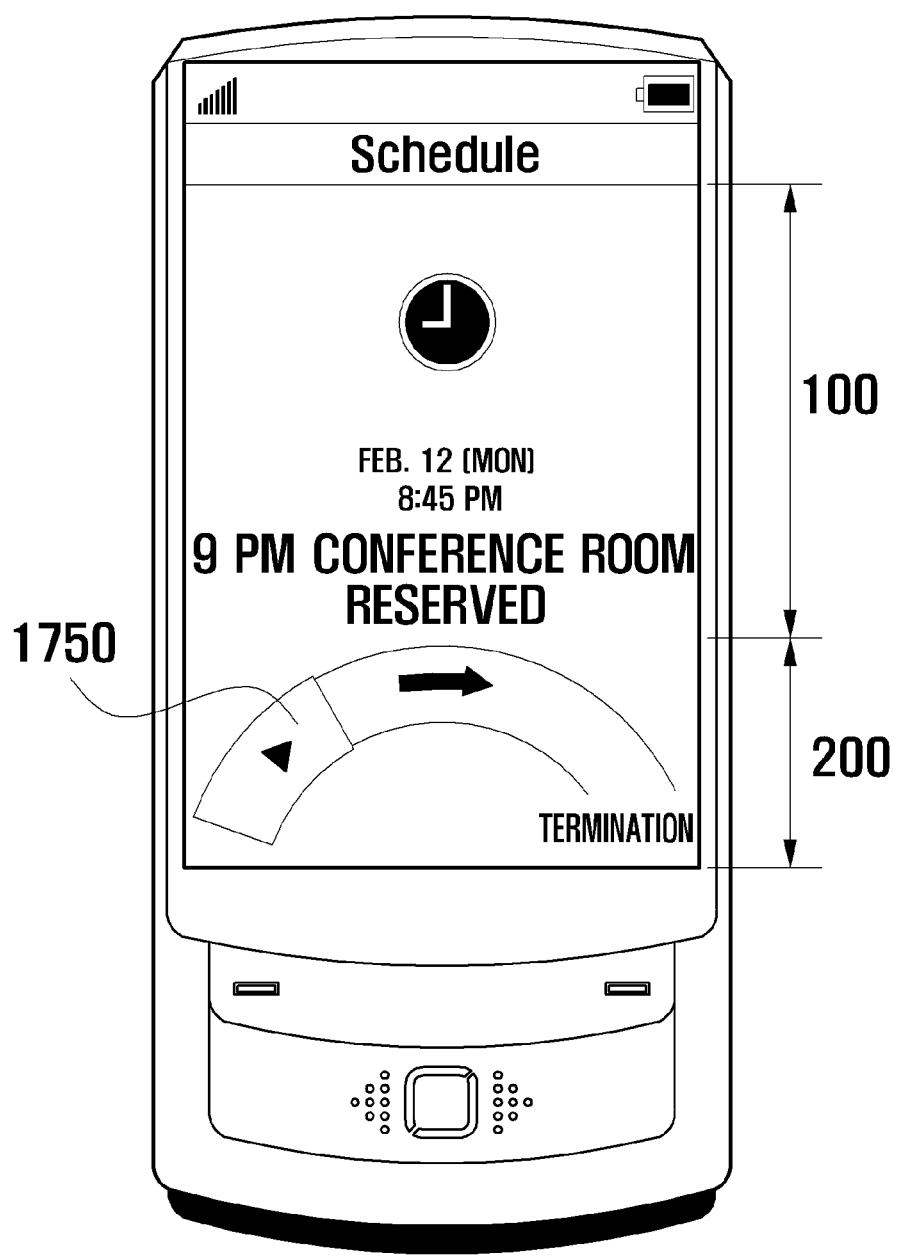

FIG. 16 and FIG. 17 show exemplary screen embodiments for displaying various GUIs provided in a control area of a portable terminal 10 according. A portable terminal 10 can use the entire control area 200 in order to provide a GUI corresponding to a particular application, and a user can generate an input event required by a particular application through a pertinent GUI. The portable terminal 10 can also control the function of an execution application according to the input event.

The exemplary screen embodiment shown in FIG. 16 illustrates the display resulting from execution of an alarm clock application, for example an alarm display generated according to a user-scheduled alarm time. Screen data according to the generation of an alarm is provided through the output area 100, and a GUI 1650 for controlling operation according to the generation of the alarm is provided in the entire control area 200. By generating an interaction gesture such as a sweep event in a function control direction desired by the user, the user can control the generated alarm by selecting a "snooze" function or a "termination" function.

The exemplary screen embodiment shown in FIG. 17 illustrates the display generated by execution of a scheduling application, for example a schedule alarm display generated by the scheduling application using schedule data from a user. Screen data providing information on a set schedule is provided through the output area 100, and a GUI 1750 for visually and intuitively providing information of a set schedule is provided in the entire control area 200. Through the GUI 1750, the user can see the information of a set schedule. The portable terminal 10 can then provide the schedule information set through the GUI 1750. As a result, the portable terminal 10 can conveniently provide progress information in relation to the set schedule.

The above description with reference to FIGS. 1 to 17 discusses a method of controlling a function of a portable terminal 10 using a display unit including an output area 100 and a control area 200 according to exemplary embodiments of the present. A portable terminal 10 for performing the operation of the present invention as described above with reference to FIGS. 1 to 17 will be discussed.

The following description is based on an assumption that the portable terminal 10 according to the present invention may include all mobile communication terminals operating based on communication protocols corresponding to various communication systems, all information communication devices and multimedia devices including a Portable Multimedia Player (PMP), a digital broadcast player, a Personal Digital Assistant (PDA), a portable game terminal, and a smart phone, and application devices thereof. Hereinafter, a general structure of a portable terminal 10 will be described with reference to FIG. 18.

Figure 18:
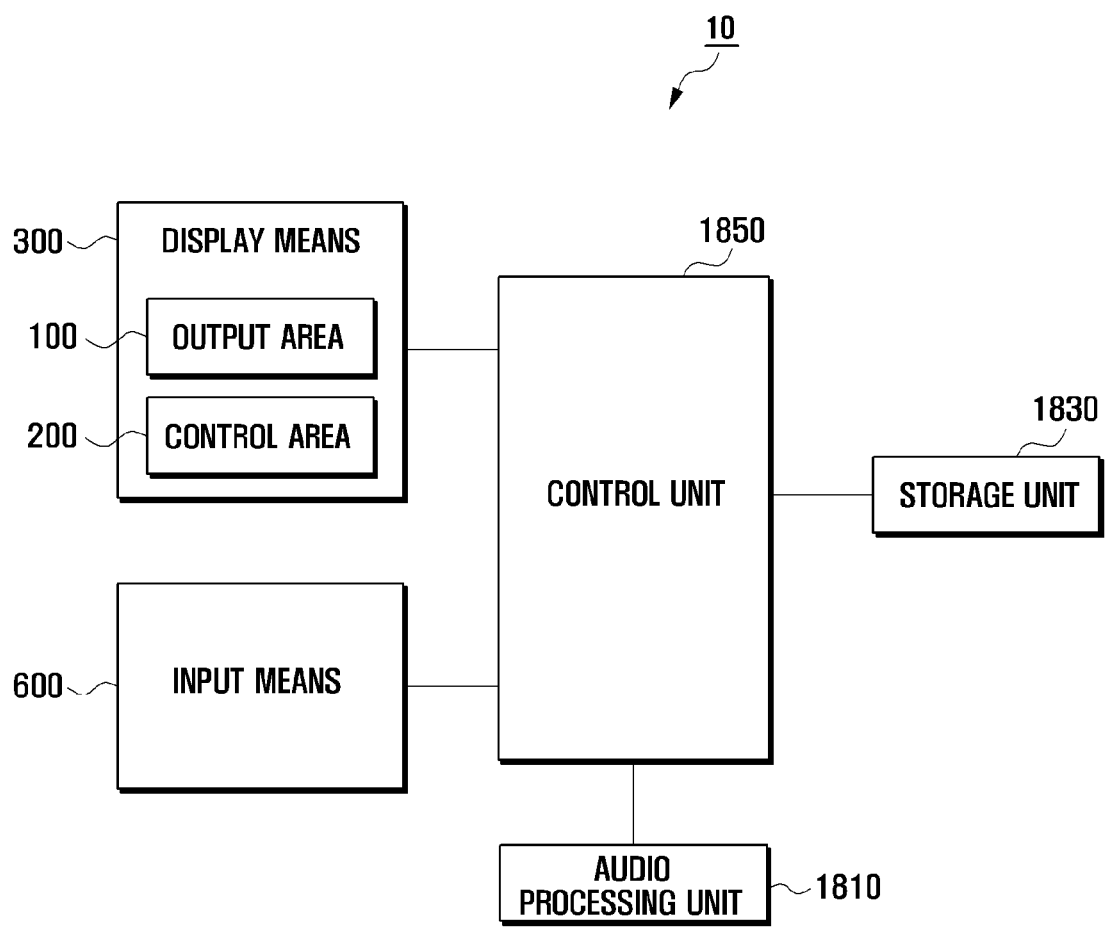
FIG. 18 is a block diagram showing an exemplary embodiment for the structure of a portable terminal according to the present invention.

FIG. 18 is a block diagram showing an exemplary embodiment of a structure for a portable terminal 10.

Referring to FIGS. 1 to 18, a portable terminal 10 includes an audio processing unit 1810, an input unit 600, a display unit 300, a storage unit 1830, and a control unit 1850. Further, the display unit 300 includes an output area 100 and a control area 200, and the control area may include a wheel area 210 and a soft key area 220.

The audio processing unit 1810 can reproduce various audio components such as an audio signal generated by reproduction of a music file according to selection by a user. The audio processing unit 1810 converts an analog signal from the control unit 1850 and then outputs the converted analog signal through a speaker (not shown).

The input unit 600 receives various inputs and transfers signal inputs in relation to the setting of various functions and function controls of the portable terminal 10 to the control unit 1850. The input unit 600 generates an input signal according to an action of the user and may include a keypad or touch pad that can receive a user input event.

The display unit 300 can be divided into the output area 100 and the control area 200. Further, in the display unit 300, the output area 100 is a non-touch area, and the control area 200 is a touch area. Moreover, the display unit 300 may include a half-touch area, and the control area 200 may correspond to an input/output unit simultaneously performing both an input function and a display function.

The display unit 300 displays screen data occurring during the operation of the portable terminal 10 and displays status information according to the user's key operation and function setting. The display unit 300 can display various screen data in relation to the status and operation of the portable terminal 10. The display unit 300 displays color information and various signals output from the control unit 1850. Moreover, the display unit 300 receives input events from the user such as a tap event, a flick event, a sweep event, or a drag-and-drop event for function control according to an execution application through the control area 200. The display unit 300 generates a signal according to the input event and transfers the generated signal to the control unit 1850.

The display unit 300 includes the output area 100 and the control area 200. The output area 100 displays objects as described above with reference to FIGS. 1 to 17. Further, the output area 100 may be provided or omitted according to the execution application and displays a GUI corresponding to the execution application. The output area 100 may display a GUI for controlling the functions and operations of the portable terminal according to the execution application. The GUI may be provided as a virtual item in various forms, changing according to the execution application.

The storage unit 1830 may include a Read Only Memory (ROM) and a Random Access Memory (RAM). The storage unit 1830 can store various data generated and used by the portable terminal 10. The data includes data occurring according to the execution of an application in the portable terminal 10, data generated by the portable terminal 10, or data received from external sources or devices, for example, a base station, counterpart portable terminal, or personal computer. The data may be obtained from a user interface provided in the portable terminal, various pieces of setup information according to the use of the portable terminal, a GUI set for an execution application, or a change in an item. Further, the storage unit 1830 may include at least one buffer for temporarily storing data occurring during execution of the application.

The control unit 1850 performs general functions of the portable terminal 10 and controls signal flow between the components of the portable terminal. The control unit 1850 controls signal flow between portable terminal 10 elements such as the audio processing unit 1810, the input unit 600, the display unit 300, and the storage unit 1830.

The control unit 1850 controls screen configuration of the display unit 300 according to the execution application. The display unit 300 may be configured either to include only the output area 100 or to include the output area 100 and the control area 200. When configuring the control area 200, the control unit 1850 provides a GUI for function control of the portable terminal 10 according to the execution application in the control area 200. The GUI may be provided in the form of a virtual item that changes according to the execution application.

In response to the user interactions occurring through the control area 200, the control unit 1850 can control functions and operations of a portable terminal 10 as described above with reference to FIGS. 1 to 18.

The control unit 1850 for operation control can control general operations of the portable terminal 10 as described above with reference to FIGS. 1 to 18. The function control of the control unit 1850 can be implemented by software.

For descriptive convenience, FIG. 18 shows a schematic construction of the portable terminal. However, the portable terminal 10 of the present invention is not limited to the exemplary embodiment shown. When the portable terminal 10 supports a mobile communication service, the control unit 1850 may include a base band module for a mobile communication service of the portable terminal 10 and may further include a Radio Frequency (RF) unit, which establishes a communication channel with a supportable mobile communication network and performs communications, such as voice communication, video telephony communication, or data communication. Further, the audio processing unit 1810 may further include a voice signal processing function according to a mobile communication service.

Further, the portable terminal 10 of the present invention may also include elements not mentioned above, which include a camera module capable of acquiring image data through photographing of an object, a digital broadcast receiving module capable of receiving a digital broadcast, a Near Field Communication (NFC) module for near field communication, and an internet communication module for performing an internet function through communication with an internet network. Although impossible to enumerate all such elements, due to convergence of digital devices, the portable terminal 10 may further include equivalents of the elements thus enumerated. Additionally, some of the elements described may be omitted or replaced by other elements in the portable terminal 10.

In the exemplary embodiments of the present invention described above with reference to FIGS. 1 to 18, a display unit 300 is constructed as a single unit and divided into the output area 100 and the control area 200. However, the display unit 300 of the present invention is not limited to a single unit. Therefore, the portable terminal 10 may have multiple separated display units, which include a typical LCD serving as an output area and a touch screen serving as a control area.

The exemplary embodiments described above can be applied to a portable terminal 10 but is not limited to portable terminals and can be applied to all types of devices having an input unit allowing user's input. The input unit may include all types of input units, such as a motion sensor for generating a gesture input signal by recognizing the motion of a user, a touch pad or display unit for generating a gesture input signal according to contact and movement of a particular object such as a finger or stylus pen, or a voice input sensor for generating a gesture input signal by recognizing the voice of the user.

Moreover, the device corresponds to an apparatus equipped with an input unit as described above and includes portable terminals (e.g., PDA, mobile communication terminal, portable game germinal, and PMP) and display devices (e.g., TV, LFD, DS, and media pole). The display unit of the electronic apparatus may include various display devices such as a LCD, a Plasma Display Panel (PDP), and an Organic Light Emitting Diode (OLED).

Further, when a portable terminal is implemented, the input unit may be either implemented as a touch pad or display unit integrally embedded in the display device or implemented as a separate device. Here, the separate device refers to a device equipped with a gyro sensor, an acceleration sensor, an IRLED, an image sensor, a touch pad, or a display unit and can recognize a motion or pointing operation. For example, the separate device can be implemented as a remote controller. The remote controller may include a keypad for recognition of button input of the user or may include a gyro sensor, an acceleration sensor, an IRLED, an image sensor, a touch pad, or a display unit so that it can recognize motion or pointing operation and provide a control signal to the device through wired or wireless communication, enabling the device to recognize the gesture according to the control signal.

According to the method and system for function control of a device as described above, it is possible to intuitively, easily and conveniently control the functions of the device through a user interface including an output area and a control area. The display unit of the device may include a non-touch area serving as an output area for outputting screen data and a half-touch area serving as a control area for input of function control according to an execution application.

In the device as described above, the user can perform function control of a device by an easy and simple operation through user interaction occurring in the control area and can intuitively recognize change information according to the control through the output area arranged over the entire screen. As a result, the disclosed portable terminal improves the convenience of operation for the user according to the control of the function of the device and provides a user with various types of control schemes through a GUI of the control area changeably provided according to the execution application.

Since the user can perform an input operation by using only the half-touch area within the entire LCD area, the user can operate the device easily and conveniently by only one hand. As a result, the convenience of operation for the user of both the touch input and key input is improved.

A quick link function allocated to navigation keys can be intuitively performed through a GUI provided in the touch area of the control area. Therefore, the user can execute a quick link function in a simple and easy manner.

The above-described methods can be realized in hardware or as software or computer code that can be stored in a recording medium such as a CD ROM, RAM, a floppy disk, a hard disk, or a magneto-optical disk or downloaded over a network so that the methods described herein can be executed using a general purpose computer or special processor or in programmable or dedicated hardware such as an ASIC or FPGA. As would be understood in the art, the computer, the processor, or the programmable hardware include memory components, e.g., RAM, ROM, and flash memory, that may store or receive software or computer code that implement the processing methods described herein when accessed and executed by the computer, processor, or hardware.

It will be apparent to those skilled in the art that various modifications and variations can be made in the present invention without departing from the spirit or scope of the invention. Thus, it is intended that the presented invention cover the modifications and variations of this invention provided they come within the scope of the appended claims and their equivalents.

What is claimed is:

1. A graphical user interface (GUI) presented in association with a device, the GUI comprising:
   an output area configured to display screen data corresponding to an application executed in association with the device; and
   a control area configured to:
      display an interactive region configured based on the application, the interactive region comprising a wheel area,
      enable control of a function of the device based on interaction with the interactive region, and enable manipulation of the screen data based on interaction with the interactive region,
wherein, in response to a period of inactivity associated with the wheel area, the GUI is configured to:
hide the wheel area, and
display an interactive component configured to enable the wheel area to be redisplayed.

2. The GUI of claim 1, wherein the output area and the control area are displayed in association with a single display unit, and wherein the control area is at least a half-touch area.

3. The GUI of claim 2, wherein the output area is a non-touch area and the control area is a touch area.

4. The GUI of claim 3, wherein the control area further comprises a soft key area, the soft key area and the wheel area being configured to receive an input of a user interaction.

5. The GUI of claim 4, wherein the wheel area is hidden if the user interaction is followed by a period of time without another user interaction.

6. The GUI of claim 5, wherein the user interaction comprises at least one of a sweep event, a flick event, or a tap event.

7. The GUI of claim 5, wherein the wheel area is divided into multiple tap points respectively corresponding to multiple execution applications, and wherein each tap point is assigned an option command in accordance with its corresponding execution application.

8. The GUI of claim 5, wherein the wheel area comprises at least one virtual item associated with function control of the execution application.

9. The GUI of claim 5, wherein the wheel area comprises at least one virtual item to which a quick link function of an execution application is mapped.

10. The GUI of claim 5, wherein reception of user interaction in the wheel area is configured to enable item navigation, item selection, item execution, or control to increase or decrease a value associated with the screen data displayed in the output area.

11. The GUI of claim 5, wherein a pop-up window generated according to function control of the device is displayed at an upper portion of the wheel area, the pop-up window being configured to receive the user interaction.

12. The GUI of claim 5, wherein the soft key area is configured to receive an input of a tap event.

13. The GUI of claim 5, wherein the soft key area is divided into multiple tap points respectively corresponding to multiple execution applications, and wherein each tap point is assigned an option command in accordance with its corresponding execution application.

14. The GUI of claim 5, wherein the soft key area comprises at least one check item corresponding to the application.

15. The GUI of claim 5, wherein user interaction in the soft key area comprises item selection, item execution, or option setting in the screen data displayed in the output area.

16. The GUI of claim 5, wherein a pop-up window generated according to function control of the device is displayed at an upper portion of the soft key area, the pop-up window being configured to receive the user interaction.

17. The GUI of claim 4, wherein the control area is further configured to enable input of one or more user interactions, the one or more user interactions comprising a sweep event in the wheel area, a tap event in the wheel area, a tap event in the soft key area, or a tap event of a virtual item in the wheel area.

18. The GUI of claim 17, wherein reception of the user interaction is configured to cause the screen data displayed in the output area or other screen data displayed in the control area to change according to the user interaction.

19. The GUI of claim 1, wherein the output area is displayed in association with a first display unit, the control area is displayed in association with a second display unit, and wherein the first display unit is different from the second display unit, and further wherein the second display unit comprises a touch screen.

20. A device, comprising:
at least one display screen configured to display:
an output area configured to display screen data corresponding to an application executed in association with the device, and
a control area configured to:
display a graphical user interface (GUI) comprising a wheel area, the GUI being configured to enable control of a function of the device based on interaction with the GUI, and
enable manipulation of the screen data based on interaction with the GUI; and
a control unit configured to:
detect execution of the application,
configure the at least one display screen to display the output area and the control area in response to the application being executed,
control the display of the screen data based on interaction with the GUI, and
control a function of the device based on interaction with the GUI,
wherein the control unit is further configured to:
detect a period of inactivity in association with the wheel area, and
configure, in response to the period of inactivity, the at least one display screen to hide display of the wheel area and display an interactive component configured to enable the wheel area to be redisplayed.

21. The device of claim 20, wherein the output area and the control area are formed in a single display unit, and the control area is at least a half-touch area.

22. The device of claim 21, wherein the output area is a non-touch area, and the control area is a touch area.

23. The device of claim 21, wherein the GUI comprises a virtual item, and wherein the control unit is further configured to configure the GUI based on an application being executed in association with the device.

24. The device of claim 23, wherein the control area further comprises a soft key area, and the soft key area and the wheel area are configured to receive the interaction.

25. The device of claim 24, wherein the wheel area is hidden if the interaction is followed by a period of time without another interaction.

26. The device of claim 25, wherein the control area is further configured to receive one or more interactions, the one or more interactions comprising a sweep event in the wheel area, a tap event in the wheel area, a tap event in the soft key area, or a tap event of a virtual item in the wheel area.

27. The device of claim 26, wherein the control unit is further configured to control corresponding functions of the device in response to reception of the interaction in the control area.

28. The device of claim 27, wherein the control unit is further configured to control display of the screen data in the output area and other screen data in the control area, and wherein the control unit is further configured to modify display of the screen data, the other screen data, or the screen data and the other screen data based on the interaction.

29. The device of claim 20, further comprising:
a plurality of display units, wherein the output area is displayed in association with a first one of the plurality of display units and the control area is displayed in association with a second one of the plurality of display units, and wherein the first display unit is different from the second display unit, and further wherein the second display unit comprises a touch screen.

30. A method, comprising:

detecting execution of an application;

causing, at least in part, screen data corresponding to the application to be displayed in an output area;

causing, at least in part, a graphical user interface (GUI) corresponding to the application to be displayed in a control area, the GUI comprising a wheel area;

processing a function in response to interaction with the GUI;

causing, at least in part, display of the screen data to be manipulated and the GUI to be modified in response to the processing of the function;

detecting a period of inactivity in association with the wheel area; and causing, at least in part, in response to the period of inactivity, display of the wheel area to be hidden and an interactive component to be displayed to enable the wheel area to be redisplayed.

31. The method of claim 30, further comprising:

determining a type of the application; and configuring at least one display unit according to the type of the application, wherein the at least one display unit comprises the output area and the control area.

32. The method of claim 31, wherein the output area and the control area are formed in a single display unit, the output area is a non-touch area, and the control area is at least a half-touch area.

33. The method of claim 32, wherein processing the function in response to the interaction comprises:

causing, at least in part, the interaction to be detected in association with the control area; and processing the function according to a portion of the control area associated with the interaction and the type of the interaction.

34. The method of claim 33, wherein processing the function in response to the interaction further comprises:

processing, if the interaction is a sweep event in a wheel area of the control area, one or more navigation commands corresponding to the sweep event;

processing, if the interaction is a tap event in the wheel area, an option command corresponding to the tap event;

processing, if the interaction is associated with a soft key displayed in the control area, a function associated with an item corresponding to the soft key; and executing, if the interaction is a tap event of a virtual item in the wheel area, an application mapped to the virtual item corresponding to the tap event.

35. The method of claim 33, wherein detecting the period of inactivity occurs after processing the function in response to the interaction.

36. The method of claim 34, wherein detecting the period of inactivity occurs after processing the function in response to the interaction, the method further comprising:

causing, at least in part, display of the soft key area to remain while causing, at least in part, display of the wheel area to be hidden in response to the period of inactivity.

* * * * *